United States Patent
Arima et al.

(10) Patent No.: US 12,146,840 B2
(45) Date of Patent: Nov. 19, 2024

(54) DEFECT INSPECTION DEVICE

(71) Applicant: HITACHI HIGH-TECH CORPORATION, Tokyo (JP)

(72) Inventors: Eiji Arima, Tokyo (JP); Toshifumi Honda, Tokyo (JP); Shunichi Matsumoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 198 days.

(21) Appl. No.: 17/922,853

(22) PCT Filed: Jun. 9, 2020

(86) PCT No.: PCT/JP2020/022646
§ 371 (c)(1),
(2) Date: Nov. 2, 2022

(87) PCT Pub. No.: WO2021/250771
PCT Pub. Date: Dec. 16, 2021

(65) Prior Publication Data
US 2023/0160835 A1 May 25, 2023

(51) Int. Cl.
*G01N 21/95* (2006.01)
*G01B 11/06* (2006.01)
(Continued)

(52) U.S. Cl.
CPC ..... *G01N 21/9501* (2013.01); *G01B 11/0608* (2013.01); *G01N 21/47* (2013.01);
(Continued)

(58) Field of Classification Search
CPC .. G01N 21/9501; G01N 21/47; G01N 21/956; G01N 2201/0636;
(Continued)

(56) References Cited

U.S. PATENT DOCUMENTS 7,872,743 B2 * 1/2011 Taniguchi ............ G01N 21/956
356/237.4
2006/0103856 A1 5/2006 Miyakawa et al.
(Continued)

FOREIGN PATENT DOCUMENTS

JP 2006-145305 A 6/2006
JP 5773939 B2 9/2015
(Continued)

OTHER PUBLICATIONS

International Search Report of PCT/JP2020/022646 dated Aug. 25, 2020.

*Primary Examiner* — Hoa Q Pham
(74) *Attorney, Agent, or Firm* — MATTINGLY & MALUR, PC

(57) ABSTRACT

An object of the invention is to provide a defect inspection device capable of correcting image forming position deviation due to displacement of a sample surface in a Z direction while enabling image forming detection from a direction not orthogonal to a longitudinal direction of illumination. The defect inspection device according to the invention is configured to determine on which lens in a lens array scattered light is incident according to a detection elevation angle of the scattered light from a sample, and an image position of the scattered light having a small elevation angle is corrected more than an image position of the scattered light having a large elevation angle.

15 Claims, 19 Drawing Sheets

(51) Int. Cl.
*G01N 21/47* (2006.01)
*G06T 7/00* (2017.01)
*G06T 7/70* (2017.01)

(52) U.S. Cl.
CPC .............. *G06T 7/0006* (2013.01); *G06T 7/70* (2017.01); *G01N 2201/06113* (2013.01); *G01N 2201/0636* (2013.01); *G06T 2207/30148* (2013.01)

(58) Field of Classification Search
CPC .......... G01N 2201/06113; G01N 2207/30148; G01N 2201/103; G01N 2201/1087; G01N 2201/121; G01N 21/8806; G01N 21/8851; G01N 21/93; G01N 2021/8848; G01B 11/0608; G06T 7/0006; G06T 7/70; G06T 7/60; H01L 21/67288; H04N 23/67
USPC .................... 356/237.1–237.5, 369, 630–632
See application file for complete search history.

(56) References Cited

U.S. PATENT DOCUMENTS

| | | | |
|---|---|---|---|
| 2006/0290923 A1* | 12/2006 | Nakano .............. | G01N 21/9501 356/237.3 |
| 2007/0216896 A1* | 9/2007 | Chikamatsu ....... | G01N 21/9501 356/237.2 |
| 2013/0242294 A1* | 9/2013 | Taniguchi ........ | G01N 21/95623 356/237.5 |
| 2015/0146200 A1 | 5/2015 | Honda et al. | |
| 2018/0038803 A1 | 2/2018 | Cui et al. | |
| 2024/0096667 A1* | 3/2024 | Yamakawa ............... | G06T 7/70 |
| 2024/0133824 A1* | 4/2024 | Urano ................ | G01N 21/8851 |

FOREIGN PATENT DOCUMENTS

| | | |
|---|---|---|
| JP | 6010042 B2 | 10/2016 |
| JP | 2019-525180 A | 9/2019 |
| WO | 2012/082501 A2 | 6/2012 |
| WO | 2020/136697 A1 | 7/2020 |

* cited by examiner

DEFECT INSPECTION DEVICE

TECHNICAL FIELD

The present invention relates to a defect inspection device that detects a defect on a sample using light.

BACKGROUND ART

In a manufacturing line of a semiconductor substrate, a thin film substrate, or the like, inspection is performed on a defect present on a surface of the semiconductor substrate, the thin film substrate, or the like in order to maintain and improve a yield of products. For example, PTL 1 is known as a related-art technique of defect inspection.

PTL 1 discloses a configuration "configured to divide full condensing NA of the condensing sub-system into different segments and direct scattered light condensed in the different segments to separate detectors" (see paragraph 0020), and discloses that, as an embodiment thereof, "an aperture mirror transmits the scattered light condensed in one of the segments of the condensing NA while reflecting the scattered light condensed in another of the segments of the condensing NA" (see paragraph 0020) regarding an aperture mirror disposed on a Fourier plane of the condensing subsystem. In addition, there is disclosed a technique of preventing surface scattering from a wafer surface by "separating scattered light in one of the different segments based on polarization to form a different portion of the scattered light" (see paragraph 0018).

PTL 2 discloses a configuration in which a large number of detection systems each having an aperture smaller than that of the "full condensing NA" in PTL are arranged. In order to accurately detect a small number of photons from a minute defect, a method for measuring, in a sensor implemented by arranging a large number of avalanche photodiode pixels, a sum of pulse currents generated by incidence of photons on the pixels arranged in the sensor has been described. This sensor is called silicon photomultiplier (Si-PM), pixelated photon detector (PPD), multi-pixel photon counter, or the like. According to this method, a sample surface is irradiated with linear illumination, and detectors arranged in multiple directions detect the light. The detector includes a sensor having pixels arranged two-dimensionally, forms an image on the sensor in a direction corresponding to a longitudinal direction of the illumination, forms a magnified image in the other direction, and combines photon counting detection and image forming detection.

CITATION LIST

Patent Literature

PTL 1: Japanese Patent No, 6010042
PTL 2: Japanese Patent No. 5773939

SUMMARY OF INVENTION

Technical Problem

Defect inspection used in a manufacturing process of a semiconductor or the like is required to include (1) detecting a minute defect, (2) measuring a dimension of the detected defect with high accuracy, (3) inspecting a sample in a non-destructive manner (for example, without altering the sample), (4) obtaining a substantially constant inspection result related to, for example, the number, position, dimension, and defect type of the detected defect when the same sample is inspected, (5) inspecting a large number of samples within a predetermined time, and the like.

In the technique disclosed in PTL 1, in order to implement inspection even for a minute defect of 20 nm or smaller, an optical path is branched such that the optical path is branched using an "aperture mirror" provided on a Fourier plane of an objective lens for discrimination from background scattered light, and each branched optical path is further branched using polarization. However, according to this method, when the optical path is branched with the "aperture mirror" provided on the Fourier plane, the mirror is inserted at an angle of typically 45 degrees or the like with respect to an optical axis, and thus an optical distance varies depending on a position where the light is incident on the mirror. For example, the "aperture mirror" arranged so as to be located on the Fourier plane at a position of a center of the optical axis of the mirror may be deviated from the Fourier plane as a distance from the optical axis increases. In addition, performing polarization separation on each of the branched optical paths complicates the optical path branching and increases a degree of difficulty in adjustment.

In the technique disclosed in PTL 2, the detection systems each having the smaller aperture are arranged, and the image generated by linear illumination is formed on the sensor in the longitudinal direction. However, during image formation in the longitudinal direction, when the detection system is disposed at a position where an optical axis of the detection system is not orthogonal to the longitudinal direction of the linear illumination, an optical distance to a sample surface may not be constant from a center of a field of view and an end of the field of view of each detection system. Therefore, it is substantially necessary to arrange all optical axes of the detection systems only at positions orthogonal to the longitudinal direction of the linear illumination. For this reason, it is difficult to completely capture scattered light from the sample surface, and the number of photons may be insufficient for detecting the minute defect.

The invention has been made in view of the above problems, and an object thereof is to provide a defect inspection device capable of correcting image forming position deviation due to displacement of a sample surface in a Z direction while enabling image forming detection from a direction not orthogonal to a longitudinal direction of illumination.

Solution to Problem

The defect inspection device according to the invention is configured to determine on which lens in a lens array scattered light is incident according to a detection elevation angle of the scattered light from a sample, and an image position of the scattered light having a small elevation angle is corrected more than an image position of the scattered light having a large elevation angle.

Advantageous Effects of Invention

According to the defect inspection device of the invention, an optical dividing unit located at a pupil position (or a position where a pupil is relayed, or in the vicinity thereof) of a condensing unit divides an optical path, whereby an image having a numerical aperture that is relatively smaller than a numerical aperture of the condensing unit in a first stage is formed in a photoelectric conversion unit. As a result, a depth of focus is increased, enabling image forming detection from the direction not orthogonal to the longitudinal direction of the illumination. That is, an image forming detection system can be provided without being restricted by an azimuth angle, and almost all the light scattered from a minute defect present on the sample surface can be imaged, enabling high-speed and high-sensitivity detection. Further, it is possible to correct the image forming position deviation due to the displacement of the sample surface in the Z direction. Problems, configurations, and effects other than those described above will be apparent from the following description of embodiments.

DESCRIPTION OF EMBODIMENTS

First Embodiment

Figure 1:
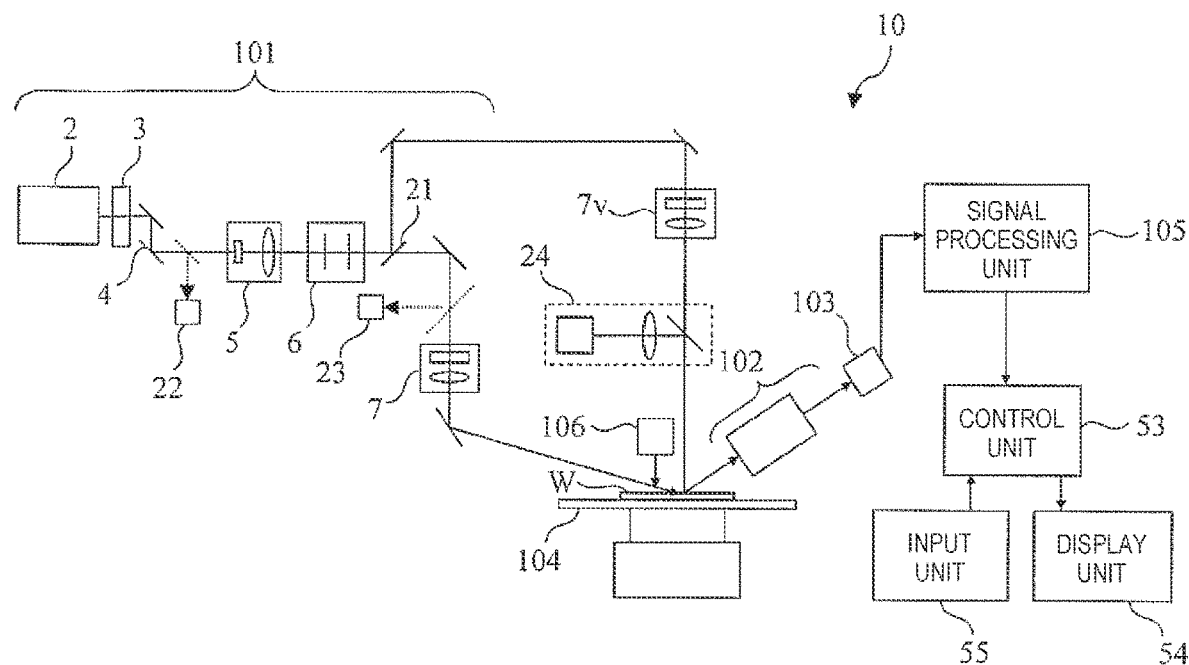
FIG. 1 is a schematic configuration diagram of a defect detection device 10 according to a first embodiment.

FIG. 1 is a schematic configuration diagram of a defect detection device 10 according to a first embodiment of the invention. The defect detection device 10 includes an illumination unit 101, a detection unit 102, a photoelectric conversion unit 103, a stage 104 on which a sample W can be placed and that is movable vertically with respect to the sample W by an actuator, rotatable in a plane of the sample W, and movable in a direction parallel to the plane of the sample W, a signal processing unit 105, a control unit 53, a display unit 54, and an input unit 55.

The illumination unit 101 appropriately includes a laser light source 2, an attenuator 3, an emitted light adjustment unit 4, a beam expander 5, a polarization control unit 6, and an illumination intensity distribution control unit 7. A laser light beam emitted from the laser light source 2 illuminates an inspection target region of the sample W by being adjusted to a desired beam intensity by the attenuator 3, adjusted to a desired beam position and a desired beam traveling direction by the emitted light adjustment unit 4, adjusted to a desired beam diameter by the beam expander 5, adjusted to a desired polarization state by the polarization control unit 6, and adjusted to a desired intensity distribution by the illumination intensity distribution control unit 7.

An incident angle of illumination light with respect to a sample surface is determined by a position and an angle of a reflection mirror of the emitted light adjustment unit 4 disposed in an optical path of the illumination unit 101. The incident angle of the illumination light is set to an angle suitable for detecting a minute defect.

As the illumination incident angle increases, that is, as an illumination elevation angle (an angle formed between the sample surface and an illumination optical axis) decreases, scattered light (referred to as haze) from minute unevenness on the sample surface, which is noise with respect to scattered light from a minute foreign object on the sample surface, becomes weak, which is suitable for detecting the minute defect. Therefore, when the scattered light from the minute unevenness on the sample surface interferes with the detection of the minute defect, the incident angle of the illumination light is preferably set to 75 degrees or lager (the elevation angle is preferably set to 15 degrees or smaller).

On the other hand, in oblique incidence illumination, as the illumination incident angle decreases, an absolute amount of the scattered light from the minute foreign object increases. Therefore, when insufficiency in the amount of scattered light from the defect hinders the detection of the minute defect, the incident angle of the illumination light is preferably set to 60 degrees or larger and 75 degrees or smaller (the elevation angle is preferably set to 15 degrees or larger and 30 degrees or smaller). When oblique incidence illumination is performed, polarized light of the illumination is set to be I'-polarized light under polarization control of the polarization control unit 6 of the illumination unit 101, whereby the scattered light from the defect on the sample surface increases as compared with a case of using other polarized light. When the scattered light from the minute unevenness on the sample surface hinders the detection of the minute defect, the polarized light of the illumination is set to be S-polarized light, whereby the scattered light from the minute unevenness on the sample surface is reduced as compared with a case of using other polarized light.

If necessary, as shown in FIG. 1, a mirror 21 is inserted into the optical path of the illumination unit 101, and another mirror is appropriately disposed, whereby the illumination optical path is changed, and the illumination light is applied from a direction substantially perpendicular to the sample surface (vertical illumination). At this time, illumination intensity distribution on the sample surface is controlled by the illumination intensity distribution control unit 7v in the same manner as the oblique incidence illumination. In order to obtain oblique incidence illumination and scattered light from a concave defect (a polishing scratch or a crystal defect in a crystal material) on the sample surface by inserting a beam splitter at the same position as the mirror 21, vertical illumination in which light is incident substantially perpendicularly on the sample surface is suitable.

In order to detect a minute defect in the vicinity of the sample surface, a laser light source, which emits an ultraviolet or vacuum ultraviolet laser beam having a small wavelength (wavelength of 355 nm or smaller) as a wavelength that is difficult to penetrate into the sample, and which has a high output of 2 W or larger, is used as the laser light source 2. A diameter of the outgoing beam is approximately 1 mm. In order to detect a defect inside the sample, a laser light source, which emits a visible or infrared laser beam having a wavelength that is likely to penetrate into the sample, is used.

The attenuator 3 appropriately includes a first polarizing plate, a half wavelength plate rotatable around the optical axis of the illumination light, and a second polarizing plate. Light incident on the attenuator 3 is converted into linearly polarized light by the first polarizing plate, a polarization direction is rotated in any direction according to a slow axis azimuth angle of the half-wavelength plate, and the light passes through the second polarizing plate. A light intensity is reduced at any ratio by controlling an azimuth angle of the half-wavelength plate. When a degree of linear polarization of the light incident on the attenuator 3 is sufficiently high, the first polarizing plate is not necessarily required. An attenuator in which a relationship between an input signal and an attenuation rate is calibrated in advance is used as the attenuator 3. As the attenuator 3, an ND filter having a gradation density distribution may be used, or ND filters having a plurality of different densities may be used by being switched between two of the ND filters.

The emitted light adjustment unit 4 includes a plurality of reflection mirrors. Here, an example in which two reflection mirrors are used will be described, but the invention is not limited thereto, and three or more reflection mirrors may be used as appropriate. Here, a three-dimensional orthogonal coordinate system (XYZ coordinates) is temporarily defined, and it is assumed that incident light on the reflection mirror travels in a +X direction. A first reflection mirror is disposed so as to deflect the incident light in a +Y direction (incident and reflected on an XY plane), and a second reflection mirror is disposed so as to deflect the light reflected by the first reflection mirror in a +Z direction (incident and reflected on a YZ plane). A position and a traveling direction (angle) of the light emitted from the emitted light adjustment unit 4 are adjusted by parallel movement and tilt angle adjustment of the reflection mirrors. As described above, by arranging an incident and reflective plane (XY plane) of the first reflection mirror and an incident and reflective plane (YZ plane) of the second reflection mirror so as to be orthogonal to each other, position and angle adjustment on the light emitted from the emitted light adjustment unit 4 (traveling in the +Z direction) can be performed independently in an XZ plane and a YZ plane.

The beam expander 5 includes two or more lens groups, and has a function of increasing a diameter of an incident parallel light flux. For example, a Galileo-type beam expander including a combination of a concave lens and a convex lens is used. The beam expander 5 is disposed on a translation stage having two or more axes, and can be adjusted in position such that a center of the beam expander 5 coincides with a predetermined beam position. A tilt angle adjustment function for the entire beam expander 5 is provided such that an optical axis of the beam expander 5 and a predetermined beam optical axis coincide with each other. By adjusting a distance between the lenses, it is possible to control a magnification of the diameter of the light flux (zoom mechanism). When the light incident on the beam expander 5 is not parallel, the light flux is increased in diameter and collimated (the light flux is made quasi-parallel) simultaneously by adjusting the distance between the lenses. The light flux may be collimated by providing a collimator lens upstream of the beam expander 5 and independently of the beam expander 5. The beam diameter magnification performed by the beam expander 5 is about 5 times to 10 times, and a beam having a beam diameter of 1 mm emitted from the light source is expanded to approximately 5 mm to 10 mm.

The polarization control unit 6 includes a half-wavelength plate and a quarter-wavelength plate, and controls a polarization state of the illumination light to any polarization state. In the middle of the optical path of the illumination unit 101, a beam monitor 22 measures a state of the light incident on the beam expander 5 and a state of the light incident on the illumination intensity distribution control unit 7.

FIGS. 2 to 6 are schematic diagrams of a positional relationship between an illumination optical axis 120 guided from the illumination unit 101 to the sample surface and an illumination intensity distribution shape. In a configuration of the illumination unit 101 in FIGS. 2 to 6, a part of a configuration of the illumination unit 101 is shown, and the emitted light adjustment unit 4, the mirror 21, the beam monitor 22, and the like are omitted.

Figure 2:
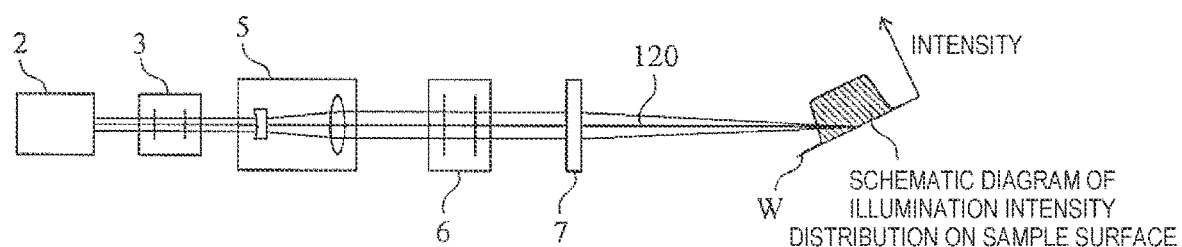
FIG. 2 is a schematic cross-sectional diagram taken along an incident plane (a plane including an illumination optical axis and a normal to a sample surface) of oblique incidence illumination.

FIG. 2 is a schematic cross-sectional diagram taken along an incident plane (a plane including the illumination optical axis and a normal to a sample surface) of oblique incidence illumination. The oblique incidence illumination is inclined with respect to the sample surface in the incident plane. A substantially uniform illumination intensity distribution is created in the incident plane by the illumination unit 101. A length of a portion where the illumination intensity is uniform is approximately 100 µm to 4 mm in order to inspect a wide area per time unit.

Figure 3:
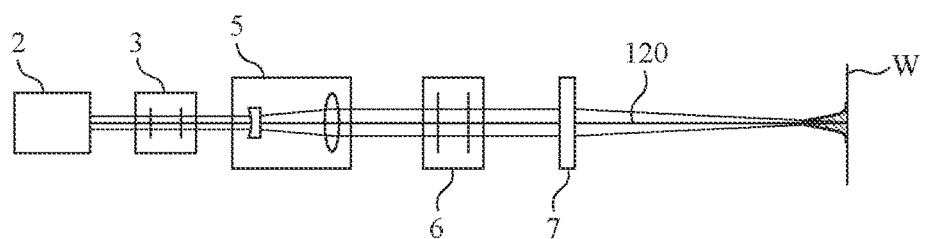
FIG. 3 is a schematic cross-sectional diagram taken along a plane including the normal to the sample surface and perpendicular to the incident plane of the oblique incidence illumination.

FIG. 3 is a schematic cross-sectional diagram taken along a plane including the normal to the sample surface and perpendicular to the incident plane of the oblique incidence illumination. In this plane; an illumination intensity distribution on the sample surface forms an illumination intensity distribution in which an intensity in a periphery is weaker than that in a center. More specifically, the intensity distribution is similar to a Gaussian distribution reflecting an intensity distribution of light incident on the illumination intensity distribution control unit 7, or a first-order Bessel function of the first type or a sine function reflecting an aperture shape of the illumination intensity distribution control unit 7. A length of the illumination intensity distribution in the plane (a length of a region having an illumination intensity of 13.5% or larger of the maximum illumination intensity) is smaller than the length of the portion where the illumination intensity is uniform in the incident plane, and is approximately 2.5 µm to 20 µm, in order to reduce a haze generated from the sample surface. The illumination intensity distribution control unit 7 includes optical elements such as an aspherical lens, a diffractive optical element, a cylindrical lens array, and a light pipe, which will be described later. As shown in FIGS. 2 and 3, the optical elements constituting the illumination intensity distribution control unit 7 are disposed perpendicular to the illumination optical axis.

Figure 4:
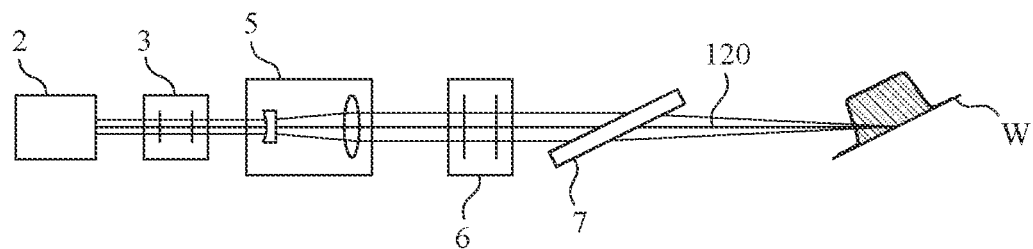
FIG. 4 shows a configuration in which an illumination intensity distribution control unit 7 is parallel to a surface of a sample 1, in contrast to a configuration shown in FIG. 2.

FIG. 4 shows a configuration in which the illumination intensity distribution control unit 7 is disposed so as to be parallel to a surface of a sample 1, in contrast to a configuration shown in FIG. 2. In this case, the illumination intensity distribution control unit 7 is disposed to be inclined with respect to the illumination optical axis 120.

Figure 5:
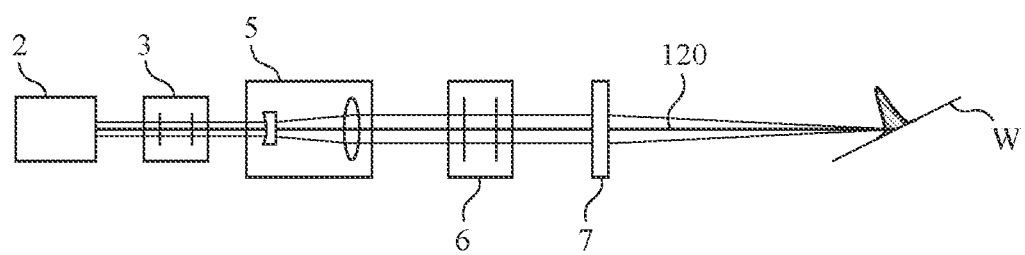
FIG. 5 is a schematic cross-sectional diagram taken along an incident plane (a plane including the illumination optical axis and a normal to the surface: of the sample 1) of oblique incidence illumination.
Figure 6:
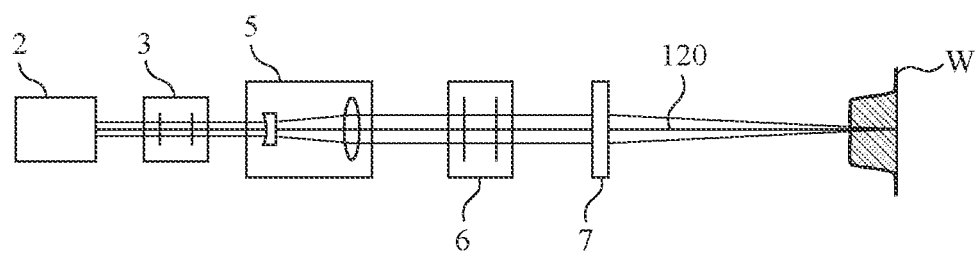
FIG. 6 is a schematic cross-sectional diagram taken along a plane including the normal to the surface of the sample 1 and perpendicular to the incident plane of the oblique incidence illumination.

Regarding a configuration shown in FIG. 5, a schematic cross-sectional diagram taken along an incident plane (a plane including the illumination optical axis and a normal to the surface of the sample 1) of oblique incidence illumination is shown. The oblique incidence illumination is inclined with respect to the surface of the sample 1 in the incident plane. In this plane, an illumination intensity distribution on the surface of the sample 1 forms an illumination intensity distribution in which an intensity in a periphery is weaker than in a center. In contrast, regarding a configuration shown in FIG. 6, a schematic cross-sectional diagram taken along a plane including the normal to the surface of the sample 1 and perpendicular to an incident plane of oblique incidence illumination is shown. A substantially uniform illumination intensity distribution is created in the incident plane.

Figure 7:
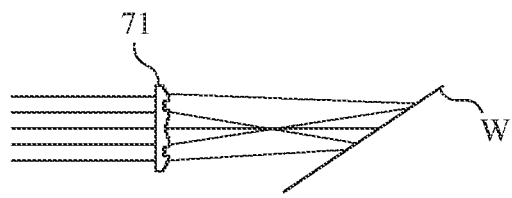
FIG. 7 shows a configuration example of the illumination intensity distribution control unit 7.

FIG. 7 shows a configuration example of the illumination intensity distribution control unit 7. The illumination intensity distribution control unit 7 includes an optical element that acts on a phase distribution and an intensity distribution of the incident light. A diffractive optical element 71 (DOE) is used as the optical element constituting the illumination intensity distribution control unit 7. The diffractive optical element 71 is formed by forming a fine undulating shape having a dimension equal to or smaller than a wavelength of light on a surface of a substrate made of a material that transmits the incident light. As the material that transmits the incident light, fused quartz is used for ultraviolet light. A material coated with an antireflection film may be used in order to prevent attenuation of light passing through the diffractive optical element 71. A lithography method is used to form the fine undulating shape. Light that has become quasi-parallel light after passing through the beam expander 5 passes through the diffractive optical element 71, and thus an illumination intensity distribution on the sample surface corresponding to the undulating shape of the diffractive optical element 71 is formed. The undulating shape of the diffractive optical element 71 is designed and manufactured to a shape obtained based on calculation using the Fourier optical theory such that the illumination intensity distribution formed on the sample surface becomes a long and uniform distribution in the incident plane. The optical elements provided in the illumination intensity distribution control unit 7 include a translation adjustment mechanism having two or more axes and a rotational adjustment mechanism having two or more axes in order to adjust the relative position and angle with respect to an optical axis of the incident light. A focus adjustment mechanism implemented based on movement in an optical axis direction is further provided. As an alternative optical element having the same function as the diffractive optical element 71, an aspherical lens, a combination of a cylindrical lens array and a cylindrical lens, or a combination of a light pipe and an image forming lens may be used.

A modification of the illumination intensity distribution created on the sample surface by the illumination unit 101 will be described. As an alternative to the illumination intensity distribution that is long (linear) in one direction and has a substantially uniform intensity in a longitudinal direction, an illumination intensity distribution having the Gaussian distribution in the longitudinal direction can also be used. Illumination having the Gaussian distribution that is long in one direction is formed by a configuration in which a spherical lens is provided in the illumination intensity distribution control unit 7 and an elliptical beam that is long in one direction is formed by the beam expander 5, a configuration in which the illumination intensity distribution control unit 7 is formed by a plurality of lenses including a cylindrical lens, or the like. A part or all of the spherical lens or the cylindrical lens provided in the illumination intensity distribution control unit 7 is disposed in parallel to the sample surface, thereby forming an illumination intensity distribution that is long in one direction on the sample surface and has a narrow width in a direction perpendicular to the one direction. As compared with a case where a uniform illumination intensity distribution is created, a variation of the illumination intensity distribution on the sample surface due to a variation of a state of the light incident on the illumination intensity distribution control unit 7 is small, and stability of the illumination intensity distribution is high. As compared with a case where a diffractive optical element, a micro-lens array, or the like is used for the illumination intensity distribution control unit 7, transmittance of the light is high and efficiency is high.

A state of the illumination light in the illumination unit 101 is measured by the beam monitor 22. The beam monitor 22 measures and outputs a position and an angle (traveling direction) of the illumination light that has passed through the emitted light adjustment unit 4, or a position and a wavefront of the illumination light incident on the illumination intensity distribution control unit 7. The position of the illumination light is measured by measuring a position of a centroid of a light intensity of the illumination light. A position sensitive detector (PSD), or an image sensor such as a CCD sensor or a CMOS sensor is used as a specific position measurement unit. The angle of the illumination light is measured by an optical position sensor or an image sensor disposed at a position farther away from the light source than the position measurement unit or at a condensing position of the collimator lens. The position of the illumination light and the angle of the illumination light detected by the sensors are input to the control unit 53 and displayed on the display unit 54. When the position or angle of the illumination light is deviated from a predetermined position or angle, the emitted light adjustment unit 4 adjusts the illumination light, to return to the predetermined position.

The wavefront of the illumination light is measured by measuring a parallelism of the light incident on the illumination intensity distribution control unit 7, When it is found by wavefront measurement that the light incident on the illumination intensity distribution control unit 7 is not quasi-parallel light but diverges or converges, the light can be brought approximate to quasi-parallel light by displacing the lens group of the beam expander 5 in a previous stage in the optical axis direction. When it is found by the wavefront measurement that the wavefront of the light incident on the illumination intensity distribution control unit 7 is partially inclined, a spatial light phase modulation element, which is a type of spatial light modulator (SLM), is inserted in the previous stage of the illumination intensity distribution control unit 7, and an appropriate phase difference is given to each position of a light flux cross section such that the wavefront becomes flat, whereby the wavefront can be brought approximate to flat, that is, the illumination light can be brought approximate to quasi-parallel light. By the above-described wavefront accuracy measurement and adjustment unit, the wavefront accuracy (deviation from a predetermined wavefront (design value or initial state)) of the light incident on the illumination intensity distribution control unit 7 is suppressed to $\lambda/10$ rms or smaller.

The illumination intensity distribution on the sample surface adjusted by the illumination intensity distribution control unit 7 is measured by an illumination intensity distribution monitor 24. As shown in FIG. 1, when vertical illumination is used, the illumination intensity distribution on the sample surface adjusted by the illumination intensity distribution control unit 7v is also similarly measured by the illumination intensity distribution monitor 24. The illumination intensity distribution monitor 24 forms an image of a sample surface on an image sensor such as a CCD sensor or a CMOS sensor via a lens and detects the image. An image of the illumination intensity distribution detected by the illumination intensity distribution monitor 24 is processed by the control unit 53, and a position of a centroid of an intensity, the maximum intensity, a maximum intensity position, a width and a length of the illumination intensity distribution (a width and a length of an illumination intensity distribution region having a predetermined intensity or larger or a predetermined ratio or larger to a maximum intensity value) are calculated, and are displayed on the display unit 54 together with a contour shape, a cross-sectional waveform, and the like of the illumination intensity distribution.

In a case of performing oblique incidence illumination, displacement of a position of the illumination intensity distribution and disturbance of the illumination intensity distribution due to defocus occur due to height displacement of the sample surface. In order to prevent this, a height of the sample surface is measured, and when the height is deviated, the deviation is corrected by height adjustment of the illumination intensity distribution control unit 7 or the stage 104 in a Z axis.

Figure 8:
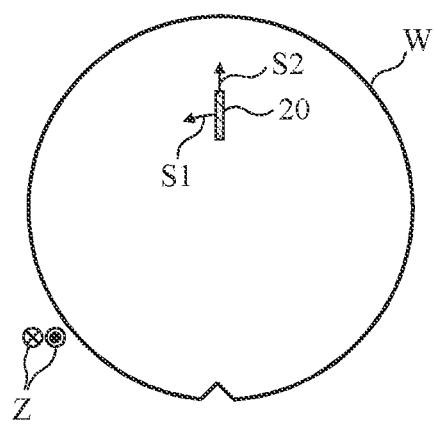
FIG. 8 is a diagram showing an illuminance distribution shape (illumination spot 20) formed on the sample surface by an illumination unit 101 and a sample scanning method.
Figure 9:
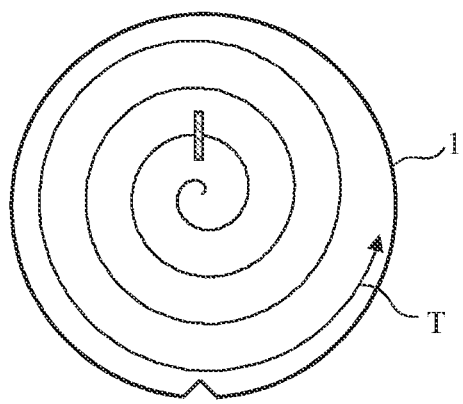
FIG. 9 is a diagram showing the illuminance distribution shape (illumination spot 20) formed on the sample surface by the illumination unit 101 and the sample scanning method.

FIGS. 8 and 9 are diagrams showing an illuminance distribution shape (illumination spot 20) formed on a sample surface by the illumination unit 101 and a sample scanning method. A circular semiconductor silicon wafer is assumed as the sample W The stage 104 includes a translation stage, a rotation stage, and a Z stage (none of which are shown) for adjusting a height of a sample surface. The illumination spot 20 has an illumination intensity distribution that is long in one direction as described above, and the direction is defined as S2, and a direction substantially orthogonal to S2 is defined as S1. By rotational movement of the rotation stage, scanning is performed in the circumferential direction Si of a circle around a rotation axis of the rotation stage, and by translational movement of the translation stage, scanning is performed in the translational direction S2 of the translation stage. While the sample is being rotated once due to scanning in the scanning direction S1, scanning is performed in the scanning direction S2 by a distance equal to or smaller than a longitudinal length of the illumination spot 20, whereby the illumination spot draws a spiral trajectory T on the sample W, and the entire surface of the sample 1 is scanned.

Figure 10:
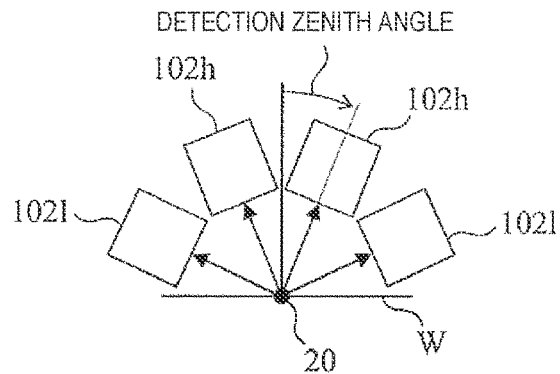
FIG. 10 is a side diagram of arrangement of detection units 102.
Figure 11:
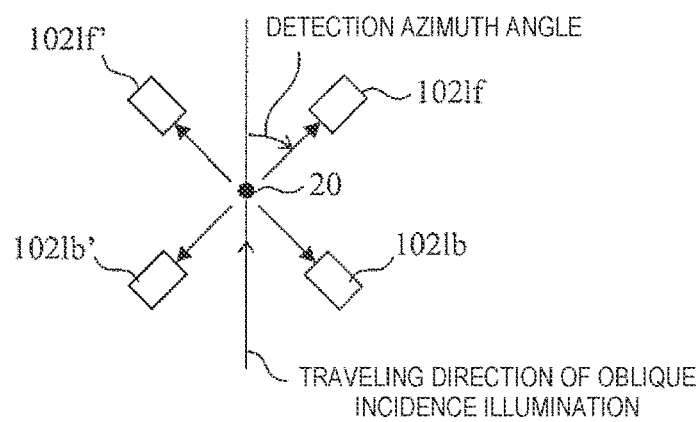
FIG. 11 is a plan diagram of arrangement of low-angle detection units 1021.
Figure 12:
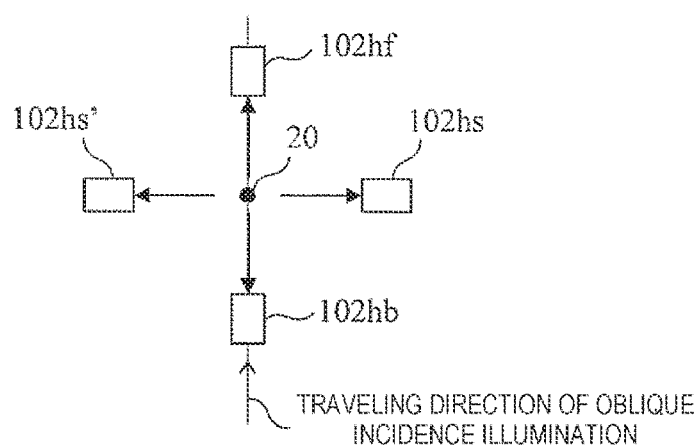
FIG. 12 is a plan diagram of arrangement of high-angle detection units 102h.

FIGS. 10 to 12 are diagrams showing arrangement examples of the detection unit 102 with respect to the sample W and the illumination spot 20. A plurality of detection units 102 are arranged so as to detect scattered light in a plurality of directions emitted from the illumination spot 20.

FIG. 10 is a side diagram of arrangement of the detection units 102. An angle formed by a detection direction (a center direction of a detection aperture) of the detection unit 102 and a normal to the sample W is defined as a detection zenith angle. The detection units 102 include appropriately high-angle detection units 102h each having a detection zenith angle of 45 degrees or smaller and low-angle: detection units 1021 each having a detection zenith angle of 45 degrees or larger. Each of the high-angle detection units 1021 and each of the low-angle detection units 1021 are provided in order to cover scattered light scattered in multiple directions at each detection zenith angle.

FIG. 11 is a plan diagram of arrangement of the low-angle detection units 1021. In a plane parallel to the surface of the sample W, an angle formed by a traveling direction of the oblique incidence illumination and a detection direction is defined as a detection azimuth angle. The low-angle detection units 1021 include a low-angle front detection unit 1021f, a low-angle side detection unit 1021f, a low-angle rear detection unit 1021b, and a low-angle side detection unit 1021b'. For example, the low-angle front detection unit 1021f is disposed at a detection azimuth angle of 0 degrees or larger and 90 degrees or smaller, the low-angle side detection unit 1021f is disposed at a detection azimuth angle of 90 degrees or larger and 180 degrees or smaller, the low-angle rear detection unit 1021b is disposed at a detection azimuth angle of 270 degrees or larger and 360 degrees or smaller, and the low-angle side detection unit 1021b' is disposed at a detection azimuth angle of 180 degrees or larger and 270 degrees or smaller.

FIG. 12 is a plan diagram of arrangement of the high-angle detection units 102h. The high-angle detection units 102h appropriately include a high-angle front detection unit 102hf, a high-angle side detection unit 102hs', a high-angle rear detection unit 102hb, and a high-angle side detection unit 102hs. For example, the high-angle front detection unit 102hf is disposed at a detection azimuth angle of 45 degrees or larger and 135 degrees or smaller, and the high-angle side detection unit 102hs' is disposed at a detection azimuth angle of 135 degrees or larger and 225 degrees or smaller.

Figure 13A:
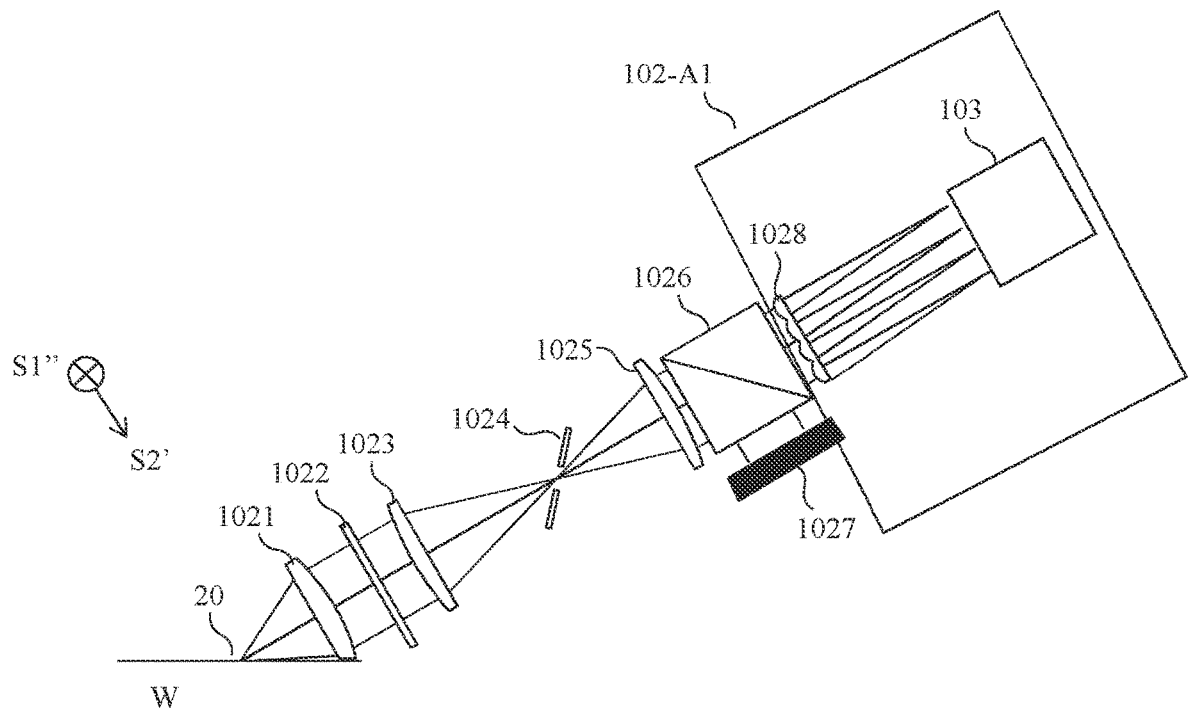
FIG. 13A shows a specific configuration example of the detection unit 102.

FIG. 13A shows a specific configuration example of the detection unit 102. Scattered light generated from the illumination spot 20 is condensed by an objective lens 1021, and a polarization direction is controlled by a polarization control filter 1022. For example, a half-wavelength plate whose rotation angle can be controlled by a drive mechanism such as a motor is applied as the polarization control filter 1022. In order to efficiently detect the scattered light, detection NA of the objective lens 1021 is preferably set to 0.3 or larger. In a case of the low-angle detection unit, a lower end of the objective lens 1021 is cut out as necessary in order to prevent the lower end of the objective lens 1021 from interfering with the sample surface W. An image forming lens of 1023 forms an image of the illumination spot 20 at a position of an aperture 1024. The aperture 1024 is an aperture set so as to allow passing of only light in a region detected by the photoelectric conversion unit 103 in the formed image of the illumination spot 20. When the illumination spot 20 has a profile of the Gaussian distribution in the S2 direction, the aperture 1024 allows only a central portion of the Gaussian distribution, which has a strong light amount in the S2 direction, to pass therethrough, and blocks a region of a beam end, which has a weak light amount. A size in the S1 direction is set to be substantially the same as a size of the formed image of the illumination spot 20, thereby preventing disturbance such as air scattering generated during transmission of the illumination in air. A reference numeral 1025 denotes a condenser lens, which condenses again the image formed at the aperture 1024. A reference numeral 1026 denotes a polarization beam splitter, which separates, according to the polarization direction, the light whose polarization direction is converted by the polarization control filter 1022. A reference numeral 1027 denotes a diffuser, which absorbs the light in the polarization direction that is not used for detection by the photoelectric conversion unit 103. A reference numeral 1028 denotes a lens array, which forms images of the illumination spot 20 on the photoelectric conversion unit 103 correspondingly to the number of the arrays. In this embodiment, only light in a specific polarization direction is detected by the photoelectric conversion unit 103 among the light condensed by the 1021 using a combination of the half-wavelength plate and the polarization beam splitter 1026. Alternatively, for example, the polarization control filter 1022 may be a wire grid polarizing plate having a transmittance of 80% or larger, and only light in a desired polarization direction may be extracted without using the polarization beam splitter 1026 and the diffuser 1027.

Figure 13B:
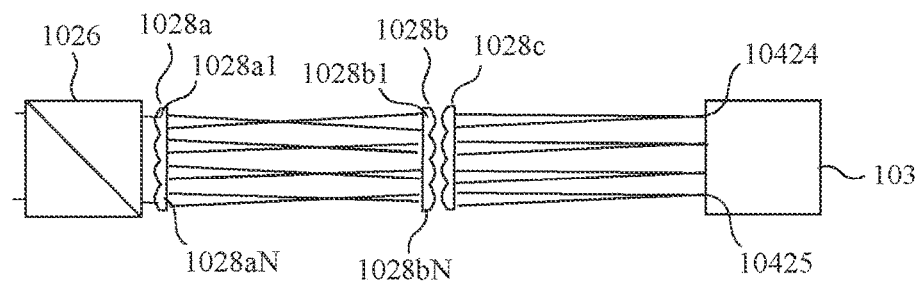
FIG. 13B shows another configuration example of an image forming unit 102-A1.

FIG. 13B shows another configuration example of an image forming unit 102-A1. In FIG. 13A, a plurality of images are formed on the photoelectric conversion unit 103 by one lens array 1028, while in FIG. 13B, images are formed by using three lens arrays 1028a, 1028b, 1028c and one cylindrical lens. First, 1028a, 1028b are lens arrays for magnification adjustment, and 1028c is a lens array for image formation. A magnification here means an optical magnification, and can be obtained based on a spread or a peak position of an intensity distribution imaged on a photoelectric conversion unit in FIG. 1413 to be described later. 1028a, 1028b are Kepler-type magnification adjustment mechanisms.

Figure 13C:
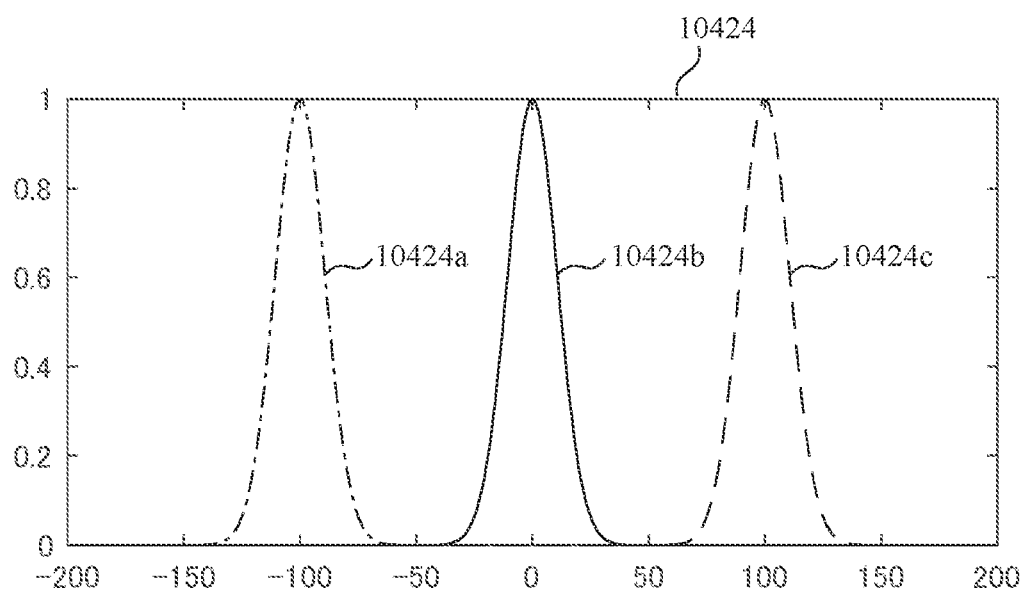
FIG. 13C shows an intensity profile of an image of a sphere having a minute size.
Figure 13D:
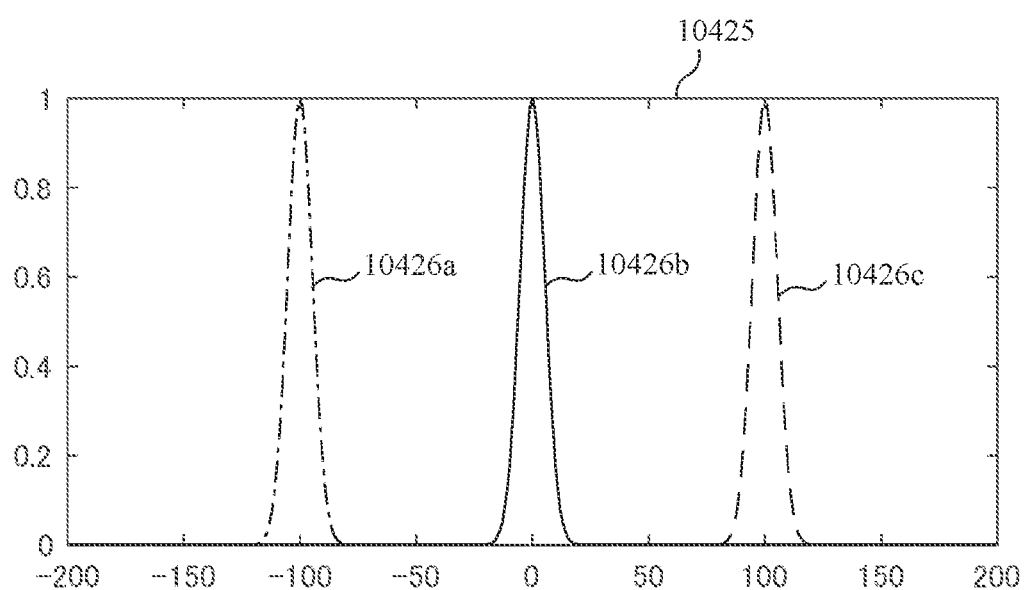
FIG. 13D shows an intensity profile of an image of a sphere having a minute size.

FIGS. 13C and 13D show intensity profiles of images of spheres having minute sizes. Reference numerals 10424a to 10424c and 10426a to 10426c denote image forming positions in the photoelectric conversion unit 10424, respectively. It can be seen that these image forming positions are the same. Although a Kepler type is used here, the invention is not limited thereto, and other adjustment mechanism such as a Galileo-type magnification adjustment mechanism may be used.

Figure 13E:
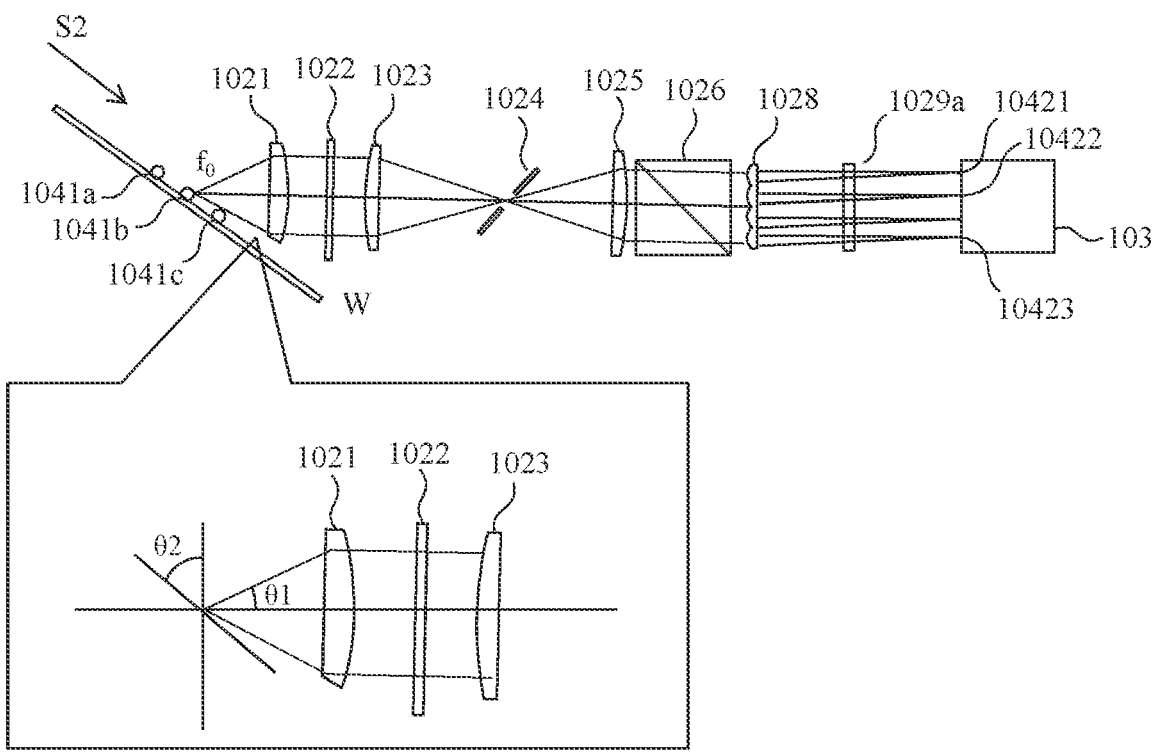
FIG. 13E is a diagram showing a magnification error of each image.

FIG. 13E is a diagram showing a magnification error of each image. In a configuration of 102-A1 without the 1028a, 1028b, a magnification error occurs in each image formed by the lens array 1028. An angle formed by a light beam incident on the objective lens 1021 and an optical axis is assumed to be θ1. An angle formed by the sample W and an axis perpendicular to the optical axis is assumed to be θ2. Here, it is assumed that θ1 passes through a center of one of the lenses constituting the lens array 1028 placed at a position where a pupil of 1021 is relayed. An angle formed by the light beam and a sample surface is represented by θ3 as expressed in the following equation.

[Math. 1]
$$\sin\theta 3 = \left(1 - \left((-\cos\theta 1 \quad -\sin\theta 1)(-\sin\theta 2 \quad \cos\theta 2)^T\right)^2\right)^{0.5} \quad (1)$$

An image formed at each of positions 10421 to 10423 on a light receiving surface of 103 has a size proportional to sin θ3(i) calculated based on a direction θ1(i) of a principal light beam incident on a lens i of 1028 forming the image.

Figure 13F:
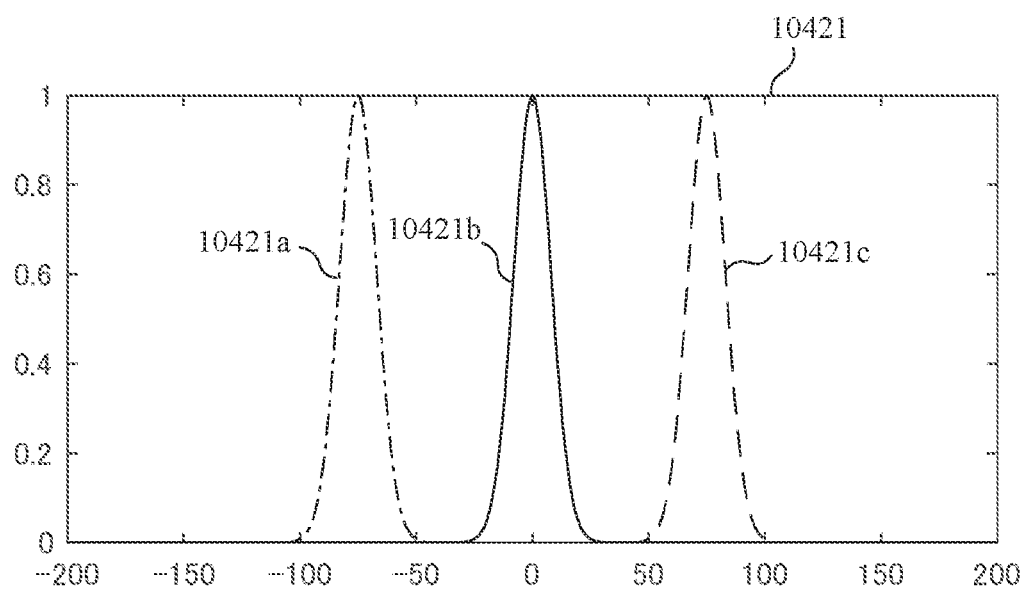
FIG. 13F shows an intensity profile of an image of a sphere having a minute size in a W.
Figure 13G:
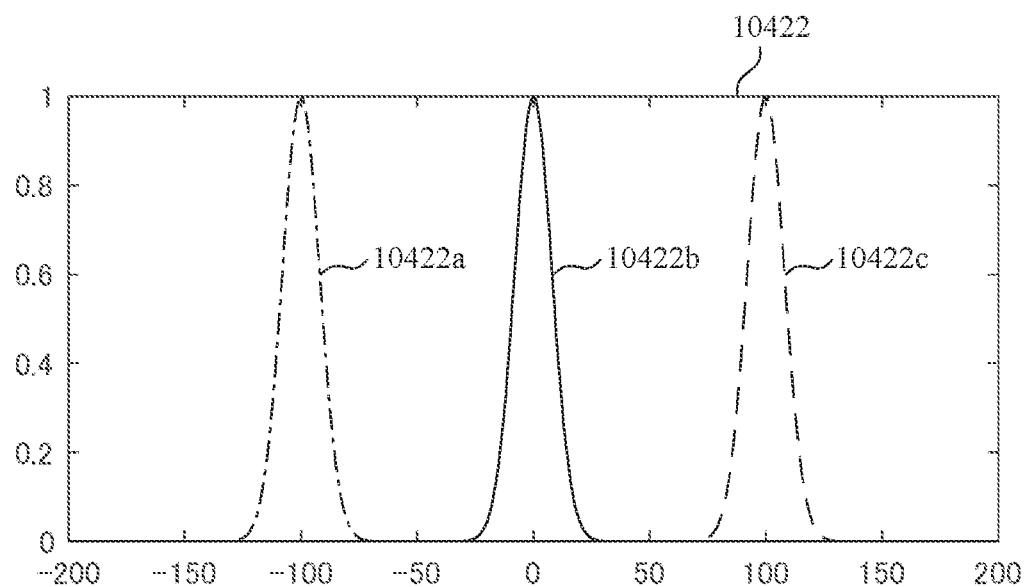
FIG. 13G shows an intensity profile of an image of a sphere having a minute size in the W.
Figure 13H:
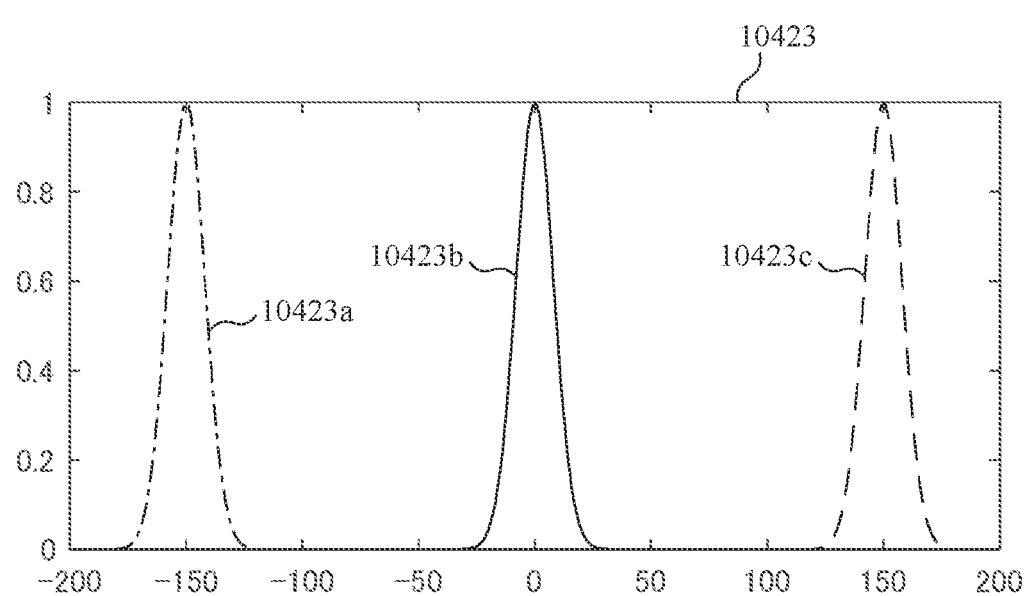
FIG. 13H shows an intensity profile of an image of a sphere having a minute size in the W.

FIGS. 13F to 13H show intensity profiles of images of spheres having minute sizes in W FIG. 13F shows a profiles of an image formed at 10421, FIG. 13G shows a profile of an image formed at 10422, and FIG. 13H shows a profile of an image formed at 10423. 10421a to 10421c correspond to 1041a to 1041c respectively in this order. 10422a to 1042 correspond to 1041a to 1041c respectively in this order. 10423a to 10423c correspond to 1041a to 1041c respectively in this order.

The intensity profiles shown in FIGS. 13F to 13H are respectively formed by different lenses constituting the lens array 1028, and thus θ1(i) is different. Accordingly, sin θ3(i), which is a value proportional to a magnification, changes. As a numerical aperture of 102 increases, a change in θ1 increases in the same lens, and a change in magnification increases accordingly. It is assumed that an image formed in this manner is formed on the photoelectric conversion unit 103 (described with reference to FIG. 16). At this time, when connected to a signal line (for example, 1035-a), a resolution of the image decreases if a pitch of pixels formed in pixel blocks 1031 to 1034 is constant. Therefore, the pitch of the pixels in the pixel blocks 1031 to 1034 is set in proportion to a magnification corresponding to each pixel block. For example, the pitch is proportional to sin θ3(i) calculated by Equation 1.

An effect of the lens array 1028 will be described in more detail with reference to FIG. 13E. The condenser lens 1025 has a large numerical aperture and is normally the same as the numerical aperture of the objective lens 1021. A condenser lens having a large numerical aperture condenses light scattered in various directions, and thus a depth of focus becomes small. When s2, which is a longitudinal direction of illumination, and an optical axis of the objective lens 1021 are arranged so as not to be orthogonal to each other, an optical distance changes between a center of a field of view and an end of the field of view, and an image formed on the photoelectric conversion unit 103 is defocused. As shown in FIG. 13E, the lens array 1028 is placed at a pupil position of the condenser lens 1025, in other words, at a relayed pupil position of the objective lens 1021, in other words, at a rear focal position of the condenser lens 1025. The condenser lens 1025 is designed to have a size equivalent to a pupil diameter, and ideally, all the light incident on an aperture diameter of the objective lens 1021 can be imaged.

Figure 13I:
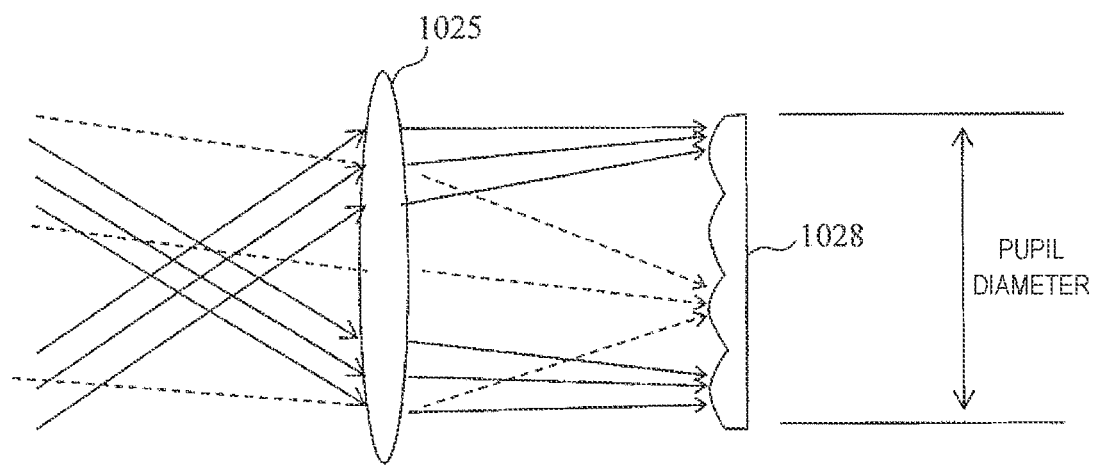
FIG. 13I is a diagram showing a relationship between a condenser lens 1025 and a lens array 1028.

FIG. 13I is a diagram showing a relationship between the condenser lens 1025 and the lens array 1028. Light having similar incident directions on the condenser lens 1025 is distributed close to each other at a position of the lens array 1028. Accordingly, placing the lens array 1028 at this position is equivalent to reducing a numerical aperture, and a depth of focus can be increased. In this way, light is divided so as to reduce the numerical aperture, and corresponding images are formed on a photoelectric conversion surface to form an image without defocus and resolve fine defects.

Figure 14A:
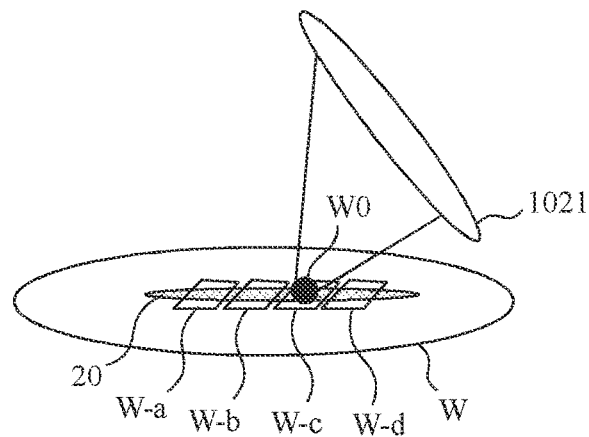
FIG. 14A is a schematic diagram of the illumination spot 20 on the sample W.

FIG. 14A is a schematic diagram of the illumination spot 20 on the sample W The illumination spot 20 extends long in the S2 direction in FIG. 8. W0 indicates a defect to be detected. The objective lens 1021 is placed in a direction in which an optical axis thereof is not orthogonal to the S2 direction. The photoelectric conversion unit 103 detects the illumination spot by dividing the illumination spot into W-a to W-d. Although the illumination spot is divided into four here, the invention is not limited to this number, and can be embodied by setting the number of divisions to any integer.

Figure 14B:
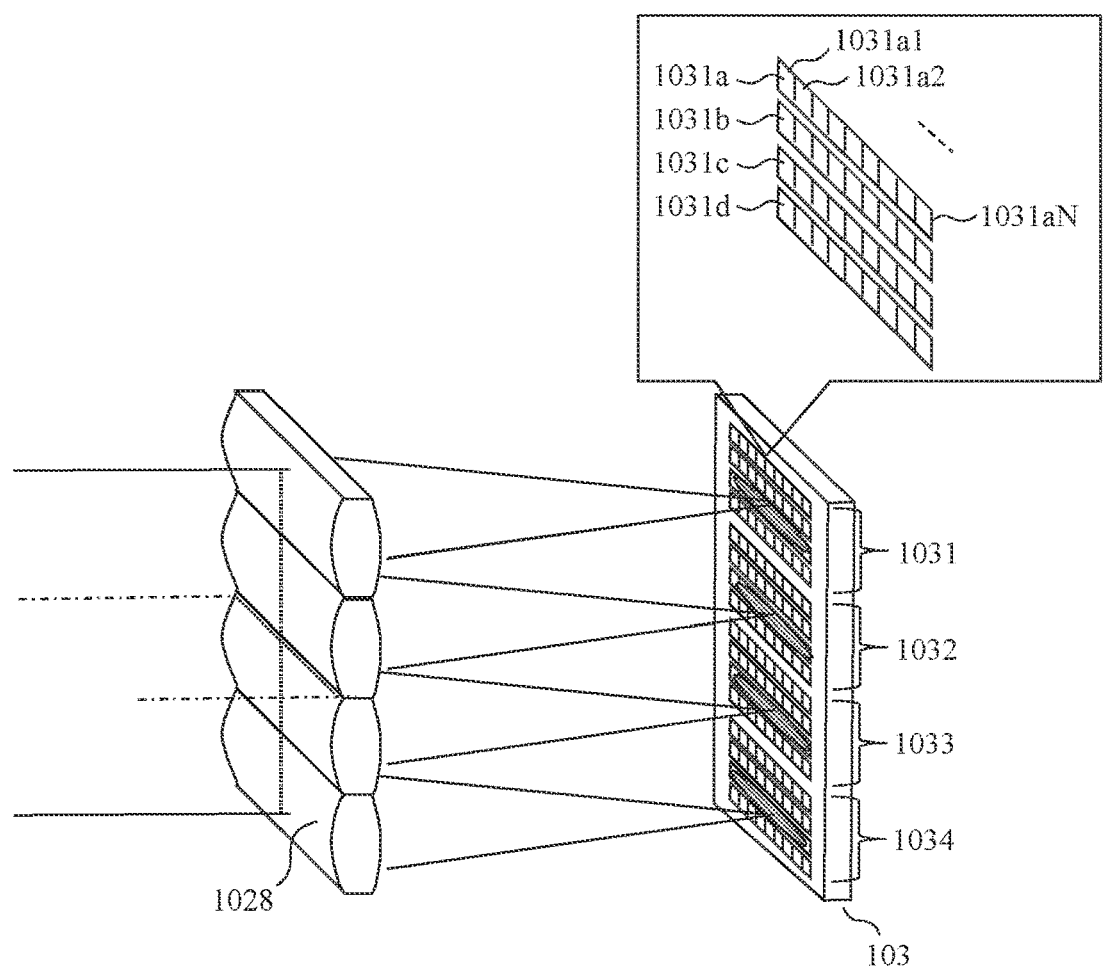
FIG. 14B shows an image forming relationship between the lens array 1028 and a photoelectric conversion unit 103.

FIG. 14B shows an image forming relationship between the lens array 1028 and the photoelectric conversion unit 103. Scattered light from the defect W0 to be detected is condensed by the objective lens 1021 and guided to photoelectric conversion. The lens array 1028 is a cylindrical lens that forms an image only in one direction. The pixel blocks 1031, 1032, 1033, 1034 corresponding to the number of lens arrays 1028 are formed in the photoelectric conversion unit 103. Since a region where an amount of light is small and the photoelectric conversion is not performed is shielded by the aperture 1024, the pixel blocks 1031 to 1034 can be formed close to each other. The lens array 1028 is placed at a position where a pupil of the objective lens is relayed. Since an image is formed for each of the divided pupil regions, an aperture of the image formed by the lens array 1028 is narrowed, and a depth of focus is increased. This enables image formation detection from a direction not orthogonal to S2.

In each of the pixel blocks, a photoelectric element is formed in a two-dimensional shape. First, the pixel block 1031 will be described. Reference numerals 1031*a* to 1031*d* denote pixel groups formed in a pixel block that is the pixel block 1031, which form images of light from the sections W-a to W-d at a position of the illumination spot, respectively. Reference numerals 1031*a*1 to 1031*a*N denote pixels belonging to 1031*a*, and each pixel outputs a predetermined current when photons are incident. Outputs of the pixels belonging to the same pixel group are electrically connected, and one pixel group outputs a sum of current outputs of the pixels belonging to the pixel group. Similarly, 1032 to 1034 also output signals corresponding to W-a to W-d. Finally, outputs corresponding to the same section from individual pixel groups are electrically connected, and the photoelectric conversion unit 103 outputs a signal corresponding to the number of photons detected from each of the sections W-a to W-d.

Figure 15:
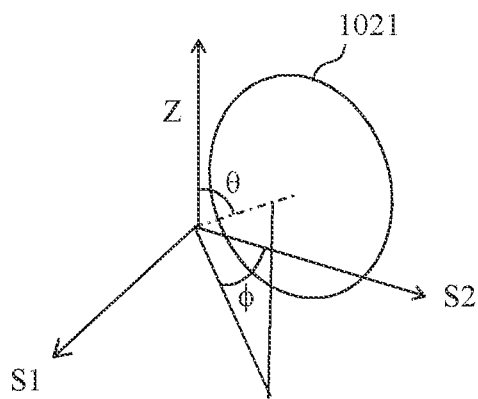
FIG. 15 is a diagram showing arrangement of a detection system.
Figure 15:
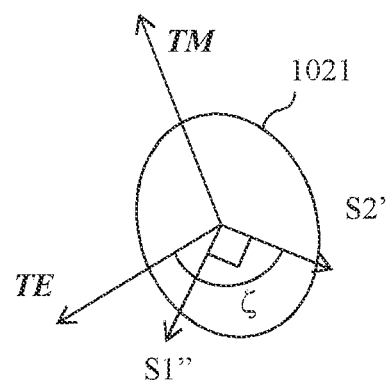

FIG. 15 is a diagram showing arrangement of a detection system. The detection system is arranged such that a longitudinal direction of a formed image of the illumination spot 20 in the photoelectric conversion unit 103 coincides with an S2' direction. Now, when S1, S2 are defined as shown in FIG. 8, a vector in a length direction of the illumination spot is expressed as in Equation (2).

[Math. 2]

$$S1=[1,0,0]'\qquad(2)$$

When an optical axis passing through a center of the objective lens 1021 is defined as an angle θ with respect to a vertical direction Z of the sample W and an angle φ with respect to S2, a vector representing the optical axis is expressed as in Equation (3).

[Math. 3]

$$D=[\sin\theta\cos\varphi,\sin\theta\sin\varphi,\cos\theta]'\qquad(3)$$

When an image of the illumination spot 20 is captured from 1021, since the same component as the optical axis in S1 disappears, this vector is expressed as in Equation (4).

[Math. 4]

$$S1'=(S1-(S1'\cdot D)D)/\|S1-(S1'\cdot D)D\|\qquad(4)$$

A two-dimensional plane excluding the optical axis of the objective lens 1021 is divided into a vector TM having a component in the Z direction and a vector TE having no component in the Z direction.

[Math. 5]

$$TM=[-\cos\theta\cos\varphi,-\cos\theta\sin\varphi,\sin\theta]'\qquad(5)$$

[Math. 6]

$$TE=[-\sin\theta\sin\varphi,\sin\theta\cos\varphi,0]'\qquad(6)$$

At this time, S2' in FIG. 15 is set in a direction rotated by an angle expressed as in Equation (7) based on the vector having no component in the Z direction expressed as in Equation (6).

[Math. 7]

$$\xi=\mathrm{atan}\,2(S1'\cdot TM,S1'\cdot TE)\qquad(7)$$

S1" is set so as to be orthogonal to S2'. In this way, 1028 and 103 are arranged.

Assuming that a length of a field of view to be detected is L, a difference Δd in an optical distance between a center of the field of view and an end of the field of view is expressed as in the following equation.

[Math. 8]

$$\Delta d=L/2\sin\theta\cos\varphi\qquad(8)$$

Assuming that a numerical aperture of 1021 is NA and the numerical aperture is divided into M by the lens array 1028, a depth of focus DOF of an image of each lens array is expressed as follows.

[Math. 9]

$$DOF = \frac{\lambda}{2(NA/M)^2} \quad (9)$$

At this time, a distance that can be resolved in the S2 direction is expressed as in the following equation based on a size of an Airy disc.

[Math.10]

$$\Delta x_{s2} = \frac{0.61M\lambda}{NA(1-(\sin\theta\cos\phi)^2)^{0.5}} \quad (10)$$

When M increases, a resolution expressed as in Equation (10) deteriorates, and defect detection sensitivity decreases. However, when the depth of focus expressed as in Equation (9) is insufficient for the difference in the optical distance in Equation (8), the resolution at the end of the field of view deteriorates and the defect detection sensitivity decreases due to the insufficient depth of focus. Therefore, M is typically set so as to satisfy the following conditions.

[Math. 11]

$$M \approx NA\left(\frac{\sin\theta\cos\phi\lambda}{L}\right)^{0.5} \quad (11)$$

Figure 16:
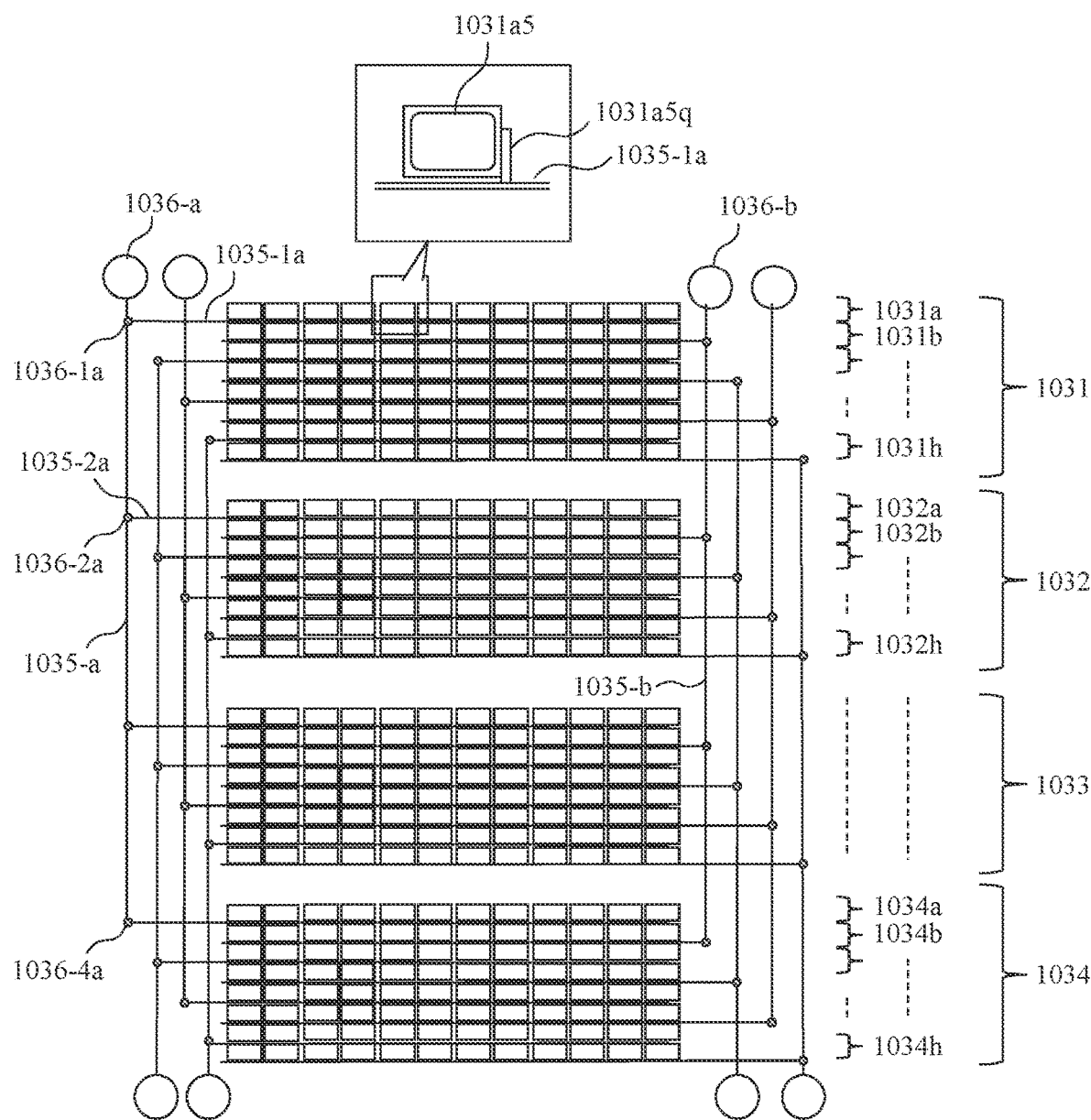
FIG. 16 is a diagram showing an internal circuit of the photoelectric conversion unit 103.

FIG. 16 is a diagram showing an internal circuit of the photoelectric conversion unit 103. FIG. 14A has described a photoelectric conversion unit that outputs corresponding to the four sections W-a to W-d, while FIG. 16 describes an example of expansion into eight sections. Eight pixel groups are formed in each of the pixel blocks 1031 to 1034. For example, 1031a to 1031h are formed in 1031, and each group of 1032 to 1034 has a similar formation. A reference numeral 1031a5 denotes a fifth pixel of 1031a, and an avalanche photodiode operating in a Geiger mode is connected to a signal line 1035-1a via a quenching resistor 1031a5q. Similarly, all the pixels belonging to the pixel group 1031a are connected to 1035-1a, and a current flows through 1035-1a when photons are incident on the pixels. A reference numeral 1035-2a denotes a signal line to which pixels of the pixel group 1032a are connected. In this way, each of all the pixel groups includes a signal line to which pixels belonging to the pixel group are electrically connected. 1031a, 1032a to 1034a are connected to 1035-a through signal lines at 1036-1a to 1036-4a, respectively, in order to detect scattered light from the same position in the sample W. This signal is connected via a pad 1036-a and transmitted to the signal processing unit 105. Similarly, pixels belonging to 1031b to 1034b are connected to a signal line 1035-b, connected via a pad 1036-b, and transmitted to 105.

Figure 17:
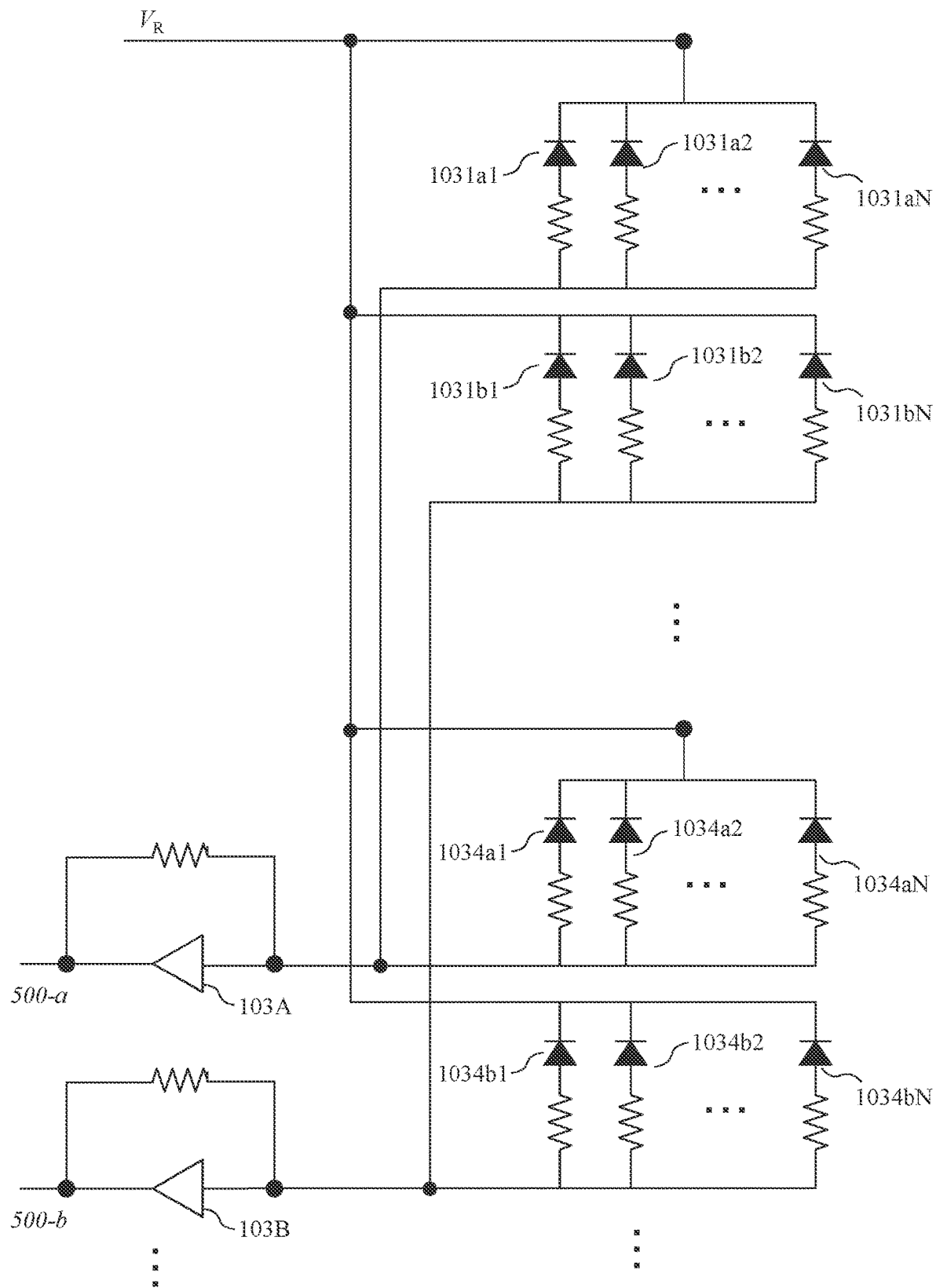
FIG. 17 shows an equivalent circuit of FIG. 16.

FIG. 17 shows an equivalent circuit of FIG. 16. N pixels 1031a1, 1031a2 to 1031aN belonging to the pixel group 1031a in the pixel block 1031 are avalanche photodiodes and quenching resistors connected thereto, respectively. A reverse voltage VR is applied to all the avalanche photodiodes formed in 103, and the avalanche photodiodes operate in the Geiger mode. When photons are incident, a current flows through the avalanche photodiode, but the paired quenching resistors lowers a reverse bias voltage and cuts off the current again. In this way, a constant current flows every time a photon is incident.

N pixels 1034a1 to 10346N belonging to the pixel group 1034a in the pixel block 1034 are also avalanche photodiodes in the Geiger mode and quenching resistors coupled thereto, respectively. All the pixels belonging to the pixel groups 1031a and 1034a correspond to light reflected or scattered from the region W-a in the sample W All these signals are electrically coupled and connected to a current-voltage conversion unit 103a. 103a outputs a voltage-converted signal 500-a.

Similarly, pixels 1031b1 to 1031bN belonging to the pixel group 1031b of the pixel block 1031 and pixels 1034b1 to 1034bN belonging to the pixel group 1034b of the pixel block 1034 correspond to light from the sample surface W-b, and all outputs thereof are electrically coupled and connected to a current-voltage conversion unit 103b. 103b outputs a voltage signal 500-b. In this way, signals corresponding to all regions obtained by dividing the illumination spot 20 are output.

Figure 18:
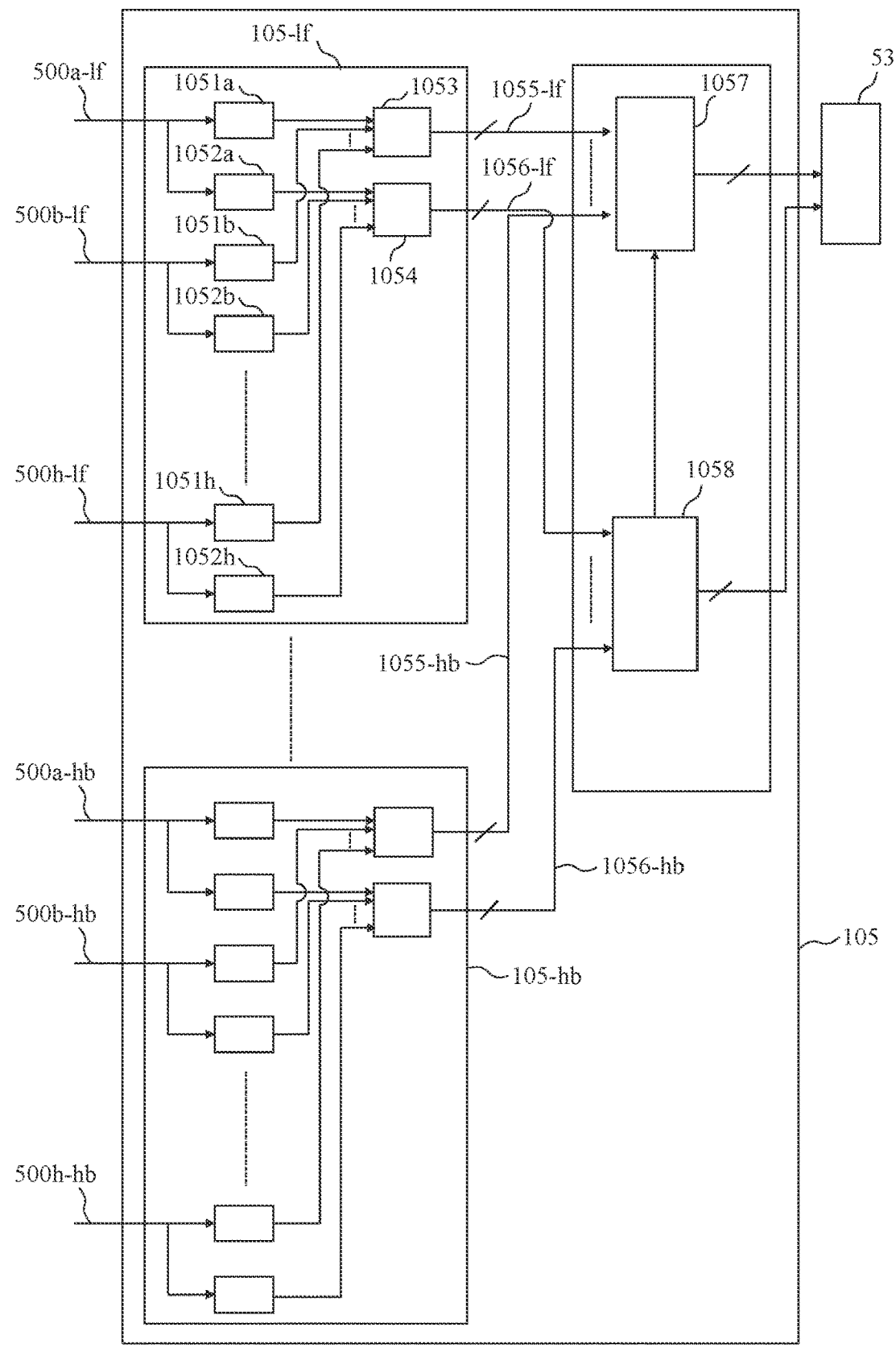
FIG. 18 shows a signal processing unit 105 when the illumination spot 20 is divided into W-a to W-h.

FIG. 18 shows the signal processing unit 105 when the illumination spot 20 is divided into W-a to W-h. A reference numeral 105-lf denotes a block for processing signals 500a-lf to 500h-lf obtained by photoelectrically converting light detected by the low-angle front detection unit 102-lf A reference numeral 105-hb denotes a block for processing signals 500a-hb to 500h-hb obtained by photoelectrically converting light detected by the high-angle rear detection unit 102-hb. Similarly, a block for processing output signals is provided corresponding to the signals output from each photoelectric conversion unit.

Reference numerals 1051a to 1051h denote high-frequency pass filters. Outputs of the high-frequency pass filters are accumulated in a signal synthesis unit 1053 for a plurality of rotations of the rotation stage, and an array-shaped stream signal synthesized by adding signals acquired at the same position on the sample W is output as 1055-lf Reference numerals 1052a to 1052h denote low-frequency pass filters. Similarly to 1053, a signal synthesis unit 1054 outputs an array-shaped stream signal 1056-lf synthesized by adding signals acquired at the same position.

105-hb also performs the same calculation as 105-lf, and an array-shaped stream signal 1055-hb synthesized based on outputs of high-frequency pass filters and an array-shaped stream signal 1056-hb synthesized based on outputs of low-frequency pass filters are output. A reference numeral 1057 denotes a defect detection unit, which executes threshold processing after linearly adding signals obtained by applying the high-frequency pass filters to signals output from a plurality of photoelectric conversion units. A reference numeral 1058 denotes a low-frequency signal integration unit that integrates signals filtered by the low-frequency pass filters. An output of 1058 is input to 1057, and is used to determine a threshold. Typically, it is estimated that noise increases in proportion to a square root of the output of 1058. Therefore, after an array-shaped stream signal of 1057 and an array-shaped stream signal of 1058 are associated with each other, the threshold proportional to the square root of the signal from 1058 is given, and the signal of 1057 exceeding the threshold is extracted as a defect. The defect detected by 1057 is output to the control unit 53 together with the signal intensity and detection coordinates at W. The signal intensity detected by 1058 is also transmitted to the control unit 53 as roughness information on the sample surface, and is output to the display unit 54 or the like for a user operating the device.

First Embodiment: Image Deviation Due to Displacement of Sample Surface

In a case of performing oblique incidence illumination, displacement of a position of the illumination intensity distribution and disturbance of the illumination intensity distribution due to defocus occur due to height displacement of the sample surface. In order to prevent this, a height of the sample surface is measured, and when the height is deviated, the deviation is corrected by height adjustment of the illumination intensity distribution control unit 7 or the stage 104 in the Z axis.

During measurement, the height of the sample surface in a Z-axis direction is displaced by several tens to several hundred μm at a frequency of several tens to several hundred Hz. Displacement is caused by deviation of the rotation axis, vibration of the stage, and the like. A position of the image formed on a sensor surface is deviated due to the Z-axis displacement of the sample surface. An image forming position deviation amount of each image obtained by dividing the Z-axis displacement is proportional to $\Delta u$ shown in Equation (12), and differs for each detection elevation angle $\theta 1(i)$. As $\theta 1(i)$ decreases, that is, as an elevation angle of a detection direction decreases, image forming position deviation increases.

[Math. 12]

$$\Delta u = \Delta w \left( \sin\left(\frac{\pi}{2} - \theta 2\right) - \tan\theta 1 \cos\left(\frac{\pi}{2} - \theta 2\right) \right) \quad (12)$$

Figure 19:
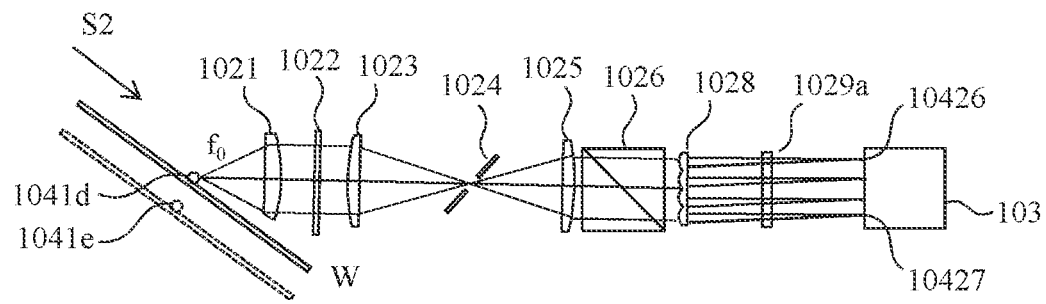
FIG. 19 is a diagram showing displacement of a sample surface in a height direction and image forming position deviation.
Figure 20:
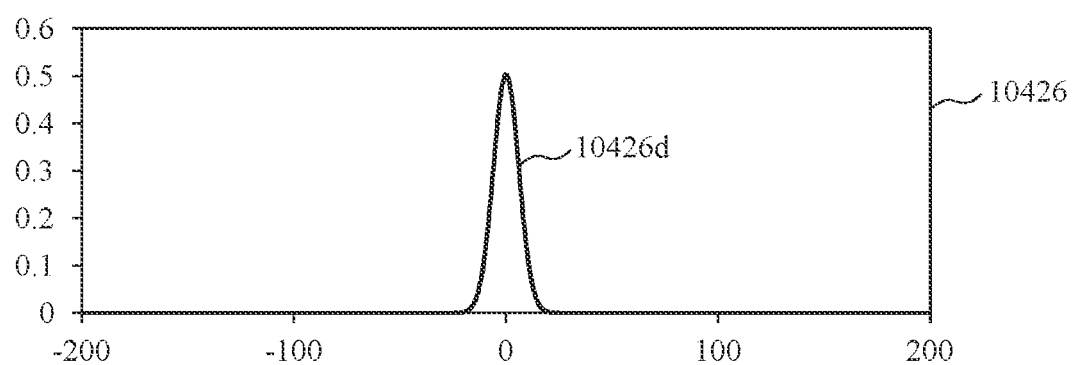
FIG. 20 is a diagram showing displacement of the sample surface in the height direction and image forming position deviation.
Figure 21:
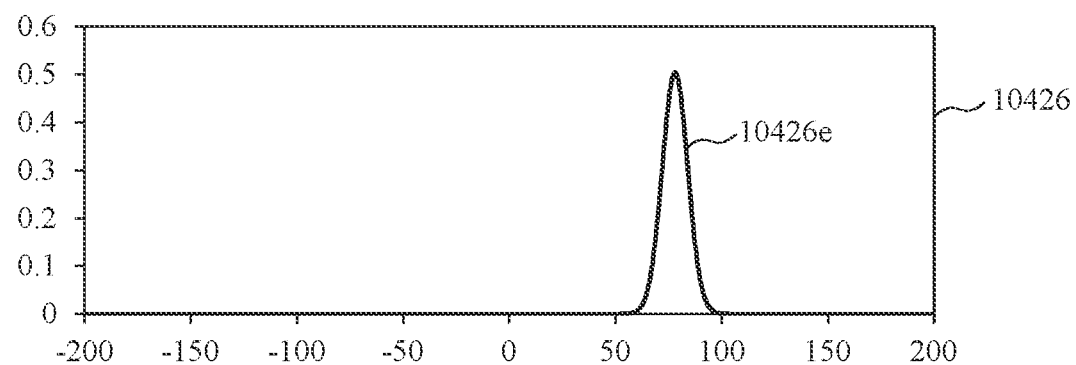
FIG. 21 is a diagram showing displacement of the sample surface in the height direction and image forming position deviation.
Figure 22:
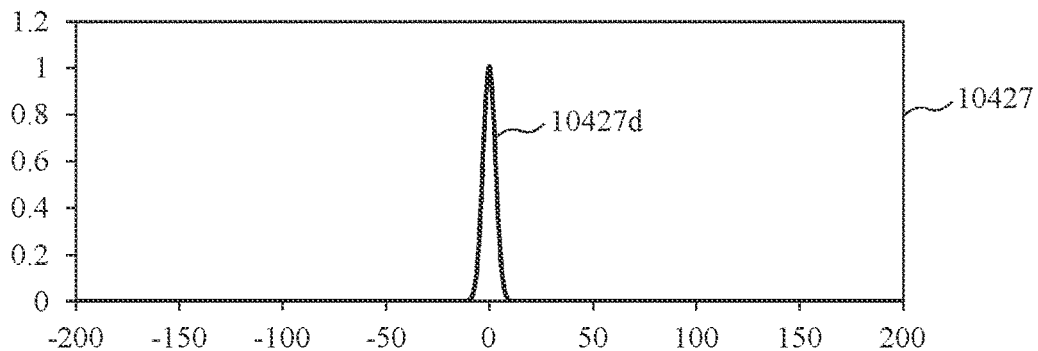
FIG. 22 is a diagram showing displacement of the sample surface in the height direction and image forming position deviation.
Figure 23:
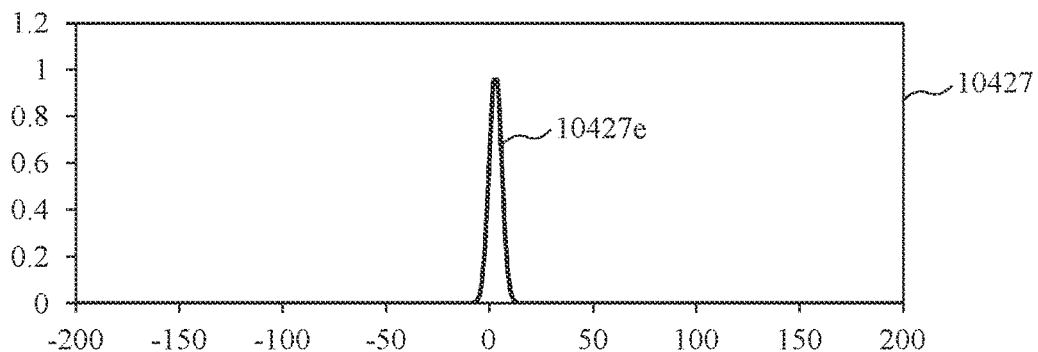
FIG. 23 is a diagram showing displacement of the sample surface in the height direction and image forming position deviation.

FIGS. 19 to 23 are diagrams showing displacement of a sample surface in a height direction and the image forming position deviation. As shown in FIG. 19, when a height of the sample surface is displaced and a foreign object 1041$d$ to be observed is displaced to 1041$e$, in a divided image 10426 having a small detection elevation angle, an image of 1041$d$ is formed as 10426$d$ in FIG. 20, whereas an image of 1041$d$ is formed as 10426$e$ in FIG. 21. A horizontal axis of each graph represents a position of a sensor surface. 10426$d$ and 10426$e$ are greatly different in the image forming position on each sensor surface. On the other hand, in a divided image 10427 having a large detection elevation angle, an image of 1041$d$ is formed as 10427$d$ in FIG. 22, whereas an image of 1041$e$ is formed as 10427$e$ in FIG. 23. In this case, due to a direction of a principal light beam and light by a magnification correction lens, position deviation is smaller than that of the divided image having the small detection elevation angle. As a result, when all the divided images are integrated, the image becomes blurred and sensitivity is lowered.

Figure 24:
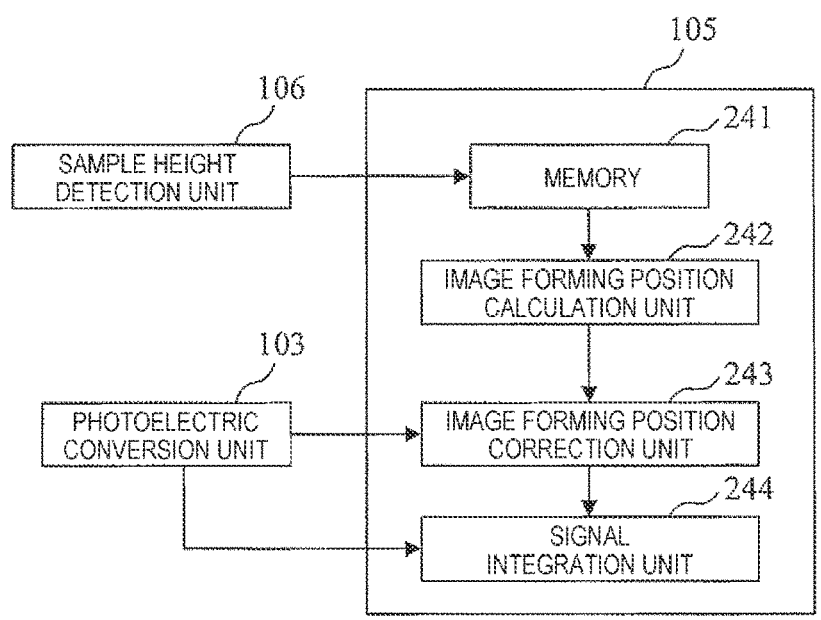
FIG. 24 is a functional block diagram showing details of the signal processing unit 105.
Figure 28:
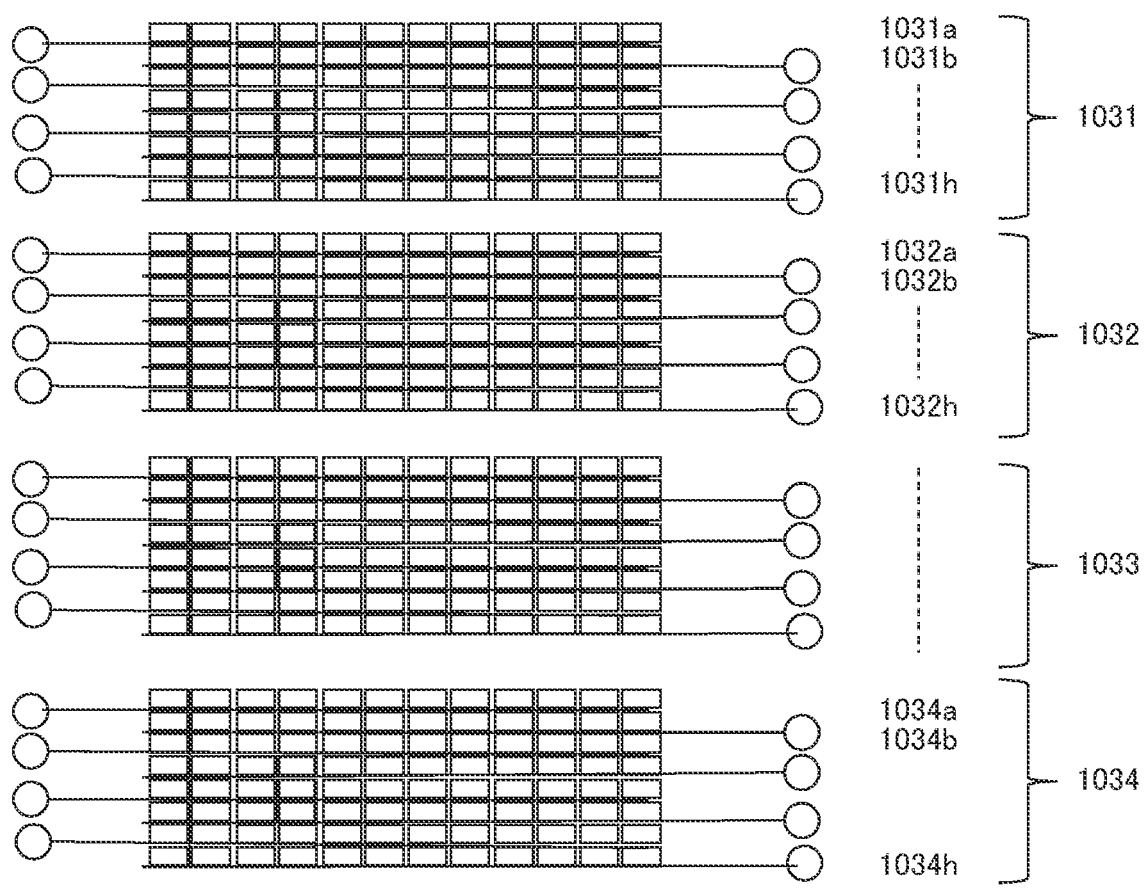
FIG. 28 shows a configuration example when the photoelectric conversion units 103 are grouped.
Figure 29:
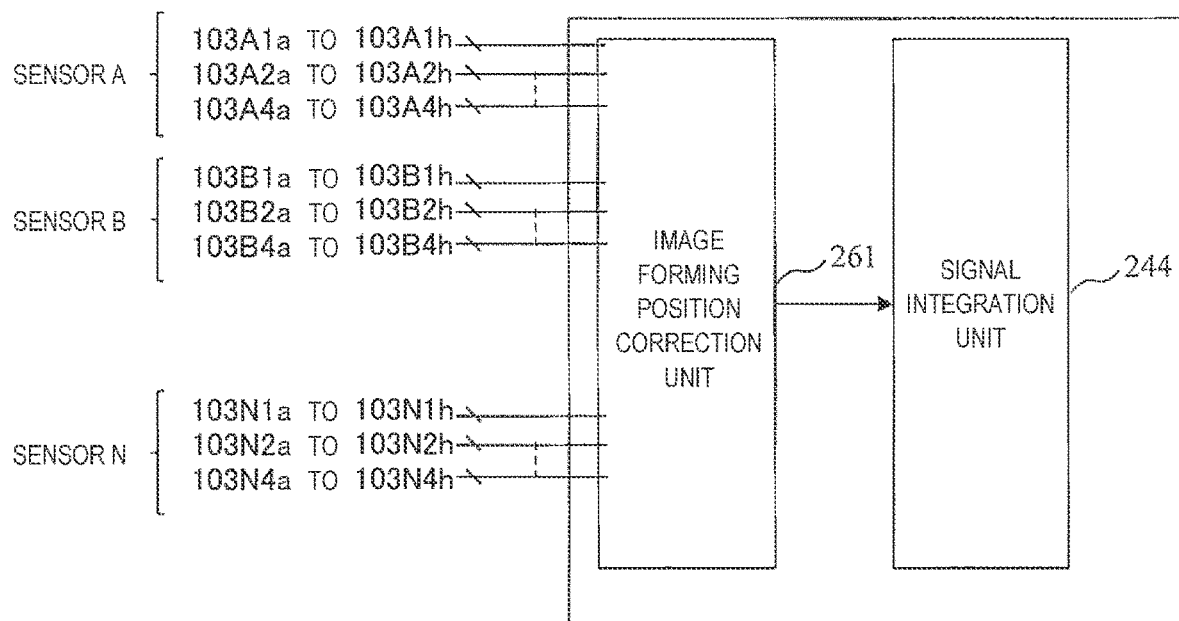
FIG. 29 shows a configuration example when the photoelectric conversion units 103 are not grouped.

FIG. 24 is a functional block diagram showing details of the signal processing unit 105. The sample height detection unit 106 (such as an optical sensor) detects Z-axis displacement of a detection area on the sample surface in real time, and stores the Z-axis displacement in a memory 241. An image forming position calculation unit 242 calculates deviation of an image forming position based on the Z-axis displacement of the detection area. The deviation of the image forming position is obtained from the Z displacement according to Equation (12). In one or more of the detection units 1021$f$, 1021$b$, 1021$f$, 1021$b'$ shown in FIG. 11, images formed in a direction in which a detection elevation angle is small and signals in a direction in which a detection elevation angle is large are divided into two or more groups and integrated by the photoelectric conversion unit 103. The photoelectric conversion unit 103 is implemented as shown in FIG. 28 so as to separately output signals of the formed images. When dividing into groups, currents of signals having approximate detection elevation angles and approximate position deviation amounts are added. An image forming position correction unit 243 corrects image forming position deviation of signals having a large image forming position deviation (that is, a group including a large number of divided images having a small detection elevation angle), and a signal integration unit 244 integrates images of all the groups. As a correction amount of image forming position deviation for each group, an average value of image forming position deviation of the divided images included in each group calculated by Equation (12) is used. In some cases, all the signals are corrected by the image forming position correction unit 243 and integrated by the signal integration unit 244 as shown in FIG. 29 without grouping. Although there are a plurality of detection units as the detection units 1021, 102$h$ shown in FIG. 10, when the detection elevation angles $\theta 1(i)$ are the same in the divided images of the detection units 102, the image forming position deviation with respect to the Z-axis displacement of the sample surface is the same. Therefore, it is also possible to divide the signals of the detection units 1021, 102$h$ into groups of signals having approximate detection elevation angles and perform current addition on the signals having approximate position deviation amounts. This prevents a decrease in sensitivity due to image forming position deviation. A mechanism in FIG. 24 can operate in real time at a frequency of several tens to several hundred Hz during inspection, and prevents a decrease in sensitivity of Z-axis displacement due to the inspection.

Figure 30:
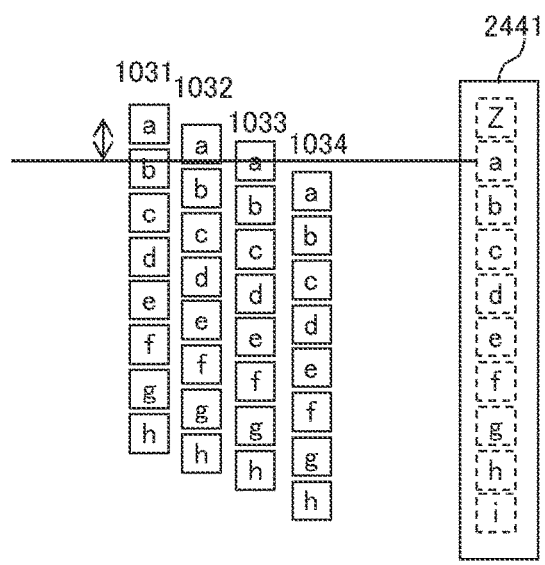
FIG. 30 shows an example of observing an observation surface in a state in which a sample surface is not Z-displaced.

By correcting image forming position deviation of each of photoelectric conversion units (1031 to 1034) by the correction mechanism, as shown in FIG. 30, in a case where regions a to h are observation surfaces in a state in which a sample surface is not Z-displaced, when signals are corrected, ends z, i of a field of view are simultaneously detected as in an integrated signal 2441. When the signals at the ends z, i of the field of view are in the scanning direction shown in FIG. 9, the same coordinates as those at the ends z, i of the field of view can be integrated by the signal processing unit 105.

The signal integration unit 244 can also operate as follows. The signal integration unit 244 groups scattered light having approximate detection elevation angles (a difference between the detection elevation angles is within a predetermined range) to form one or more scattered light groups. The signal integration unit 244 first integrates images of members in a group for each group to generate temporary integrated images of the same number as the number of groups. The image forming position correction unit 243 corrects an image forming position for each temporary integrated image (that is, group). The signal integration unit 244 generates a final integrated image by integrating again the temporary integrated images after correcting the image forming positions.

First Embodiment: Overview

The defect detection device 10 according to the first embodiment is configured such that the scattered light having approximate incident angles on the condenser lens 1025 is incident on substantially the same position on the lens array 1028, and image position deviation is corrected more for the scattered light having a large detection elevation angle. Accordingly, even a minute defect can be accurately detected, and image deviation due to displacement of the sample surface in the Z direction can be accurately corrected.

Second Embodiment

Figure 25:
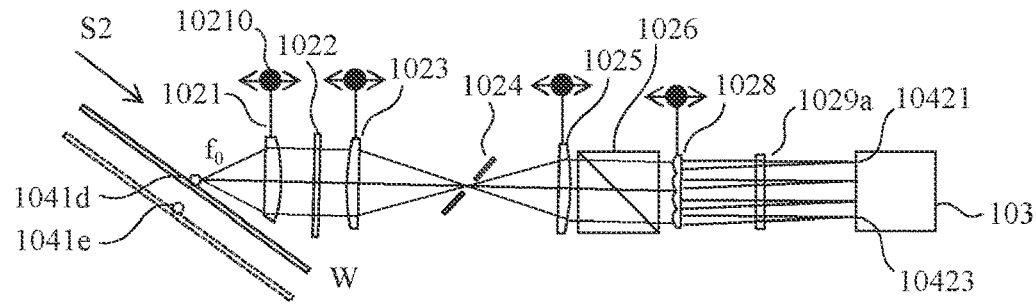
FIG. 25 is a configuration diagram of the defect detection device 10 according to a second embodiment.

FIG. 25 is a configuration diagram of the defect detection device 10 according to a second embodiment of the invention. In the first embodiment, the signal processing unit 105 corrects the image position deviation, while in the second embodiment, image position deviation is corrected by adjusting a position of an optical element in a detection optical system. Other configurations are the same as those of the first embodiment.

In the detection unit 102, one or more of the objective lens 1021, the relay lenses 1023, 1025, and the lens array 1028 are attached with a mechanism that adjusts a position along an optical axis direction as shown in FIG. 25. For example, a micrometer equipped with a piezo motor can be used as the adjustment mechanism.

Figure 26:
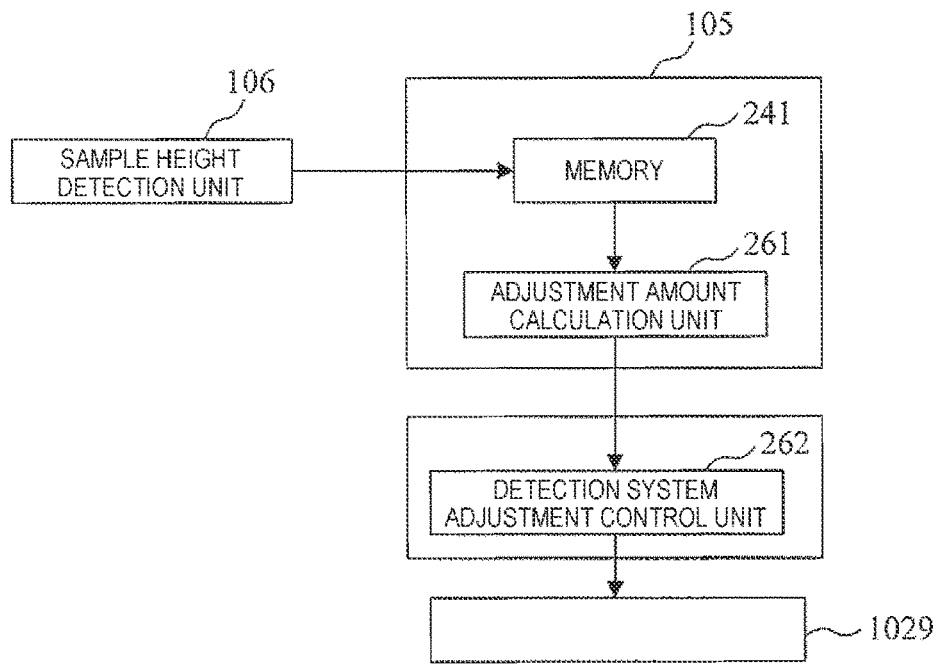
FIG. 26 is a functional block diagram showing details of a signal processing unit.

FIG. 26 is a functional block diagram showing details of a signal processing unit. An adjustment amount calculation unit 261 calculates an adjustment distance in an optical axis direction based on Z-axis displacement of a sample surface stored in the memory 241, and a detection system adjustment control unit 262 adjusts a part (one or more optical elements) of the detection units 102 in the optical axis direction. This can reduce a difference in image forming position deviation between divided images due to the Z-axis displacement of the sample surface, reduce blurring of an integrated image, and prevent a decrease in sensitivity.

Which optical element is to be adjusted in position can be determined as follows. When an optical system from the objective lens 1021 to the lens array 1028 is regarded as a composite lens, an operation of the composite lens can be calculated. Therefore, when a position of any one of the optical elements is moved, the operation of the composite lens caused by the movement can also be calculated. The adjustment amount calculation unit 261 can calculate each image position deviation by calculating the operation of the composite lens when one or more of the optical elements from the objective lens 1021 to the photoelectric conversion unit 103 are selected and a position thereof is moved, for example. The adjustment amount calculation unit 261 can determine an optical element to be adjusted in position and a position movement amount thereof by searching for a combination of the optical element and a position adjustment amount in which each image position deviation is minimum. The search may be performed at random, or using a search algorithm based on an appropriate evaluation function. Alternatively, if an optical element to be adjusted in position preferentially is determined in advance (for example, an optical element having a small size is given priority), position adjustment may be performed in order from the optical element.

When image position deviation remains after a position of the optical element is adjusted, the signal processing unit 105 may further correct the image position deviation by the image forming position correction unit 243 described in the first embodiment. In this case, the image forming position calculation unit 242 calculates an image position after the position of the optical element is adjusted, and the image forming position correction unit 243 corrects the remaining image position deviation.

Third Embodiment

Figure 27:
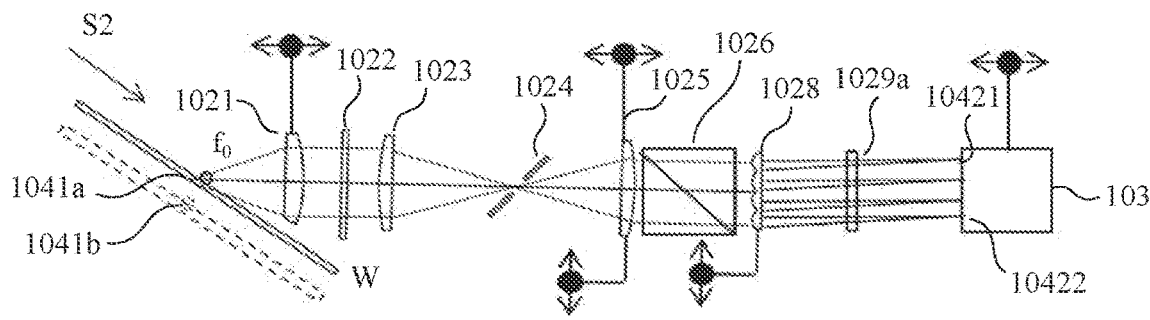
FIG. 27 is a configuration diagram of the defect detection device 10 according to a third embodiment.

FIG. 27 is a configuration diagram of the defect detection device 10 according to a third embodiment of the invention. In the third embodiment, an optical element of the detection units 102 is moved along an optical axis direction as well as a direction orthogonal to an optical axis. Other configurations are the same as those of the second embodiment.

In the detection unit 102, one or more of the objective lens 1021, the relay lenses 1023, 1025, the lens array 1028, and the photoelectric conversion unit 103 are attached with an adjustment mechanism 1029 for adjustment in the direction orthogonal to the optical axis as shown in FIG. 27. A micrometer or the like equipped with a piezo motor can be used as the adjustment mechanism. As described in the second embodiment, a mechanism that adjusts a position along the optical axis direction may be used in combination.

Image forming position deviation between divided images due to Z-axis displacement of a sample surface is reduced by adjusting a position of the optical element along the optical axis direction. Image forming position deviation of all the divided images is reduced by adjusting the position in the direction perpendicular to the optical axis direction. As a result, blurring of an integrated image can be reduced, and a decrease in sensitivity can be prevented.

In the third embodiment, similarly to the second embodiment, when the image position deviation remains after the position of the optical element is adjusted, the image position deviation may be further corrected by the image forming position correction unit 243 described in the first embodiment. Similarly to the second embodiment, which optical element is to be adjusted in position can be determined by calculating an operation of a composite lens.

Modifications of Invention

The invention is not limited to the embodiments described above, and includes various modifications. For example, the embodiments described above have been described in detail for easy understanding of the invention, and the invention is not necessarily limited to those including all the configurations described above. A part of the configuration of one embodiment may be replaced with the configuration of another embodiment, and the configuration of another embodiment may be added to the configuration of one embodiment. In addition, a part of the configuration of each embodiment may be added to, deleted from, or replaced with another configuration.

In the embodiments described above, the signal processing unit 105 may be implemented by hardware such as a circuit device that implements a function, or may be implemented by an arithmetic device executing software that implements a function.

FIGS. 10 to 12 show a case where there are four high-angle detection units 102*h* and four low-angle detection units 1021, but the invention is not limited thereto, and the number and positions of the detection units may be appropriately changed.

In the embodiments described above, an example in which the invention is applied to a defect inspection device used in a manufacturing process of a semiconductor or the like has been described, but the invention can also be applied to other devices that inspect defects using light.

REFERENCE SIGNS LIST

10: defect detection device
2: light source
5: beam expander
6: polarization control unit
7: illumination intensity distribution control unit
24: illumination intensity distribution monitor
53: control unit
54: display unit
55: input unit
101: illumination unit
102: detection unit
103: photoelectric conversion unit
104: stage
105: signal processing unit
106: sample height detection unit
1021: objective lens
1022: polarization control filter
1023: relay lens
1024: aperture
1025: condenser lens
1026: polarization beam splitter
1027: diffuser
1028: lens array
1029: adjustment mechanism

The invention claimed is:

1. A defect detection device that detects a defect on a sample using light, the defect detection device comprising:
   an illumination unit configured to irradiate a sample with light emitted from a light source;
   a detection unit configured to detect scattered light generated from the sample when the sample is irradiated with the light;
   a photoelectric conversion unit configured to convert the scattered light detected by the detection unit into an electrical signal; and
   a signal processing unit configured to detect the defect by processing the electrical signal, wherein
   the detection unit includes: as a detection optical system,
      a condenser lens configured to condense the scattered light, and
      a second lens configured to guide the scattered light condensed by the condenser lens to the photoelectric conversion unit,
   the second lens divides a light beam for each pupil region and makes the light beam to be incident on the photoelectric conversion unit,
   the condenser lens and the second lens are configured such that:
      first scattered light whose elevation angle from the sample is a first elevation angle is incident on the condenser lens at a first incident angle, and is incident on the second lens, and
      second scattered light whose elevation angle from the sample is a second elevation angle larger than the first elevation angle is incident on the condenser lens at a second incident angle different from the first incident angle, is incident on the second lens, and is incident on the photoelectric conversion unit at a region different from that of the first scattered light,
   the defect detection device further comprises:
      a correction unit configured to correct at least one of a first position of a first image of the first scattered light and a second position of a second image of the second scattered light, and
      a first correction amount when the correction unit corrects the first position is larger than a second correction amount when the correction unit corrects the second position.

2. The defect detection device according to claim 1, wherein
   the detection unit includes an image forming optical system disposed in a direction not orthogonal to a longitudinal direction of the illumination light.

3. The defect detection device according to claim 1, wherein
   the correction unit corrects at least one of the first position and the second position by adjusting a position of an optical element provided in the detection optical system.

4. The defect detection device according to claim 3, wherein
   the detection unit further includes, as the detection optical system, an objective lens configured to guide the scattered light to the condenser lens, and
   the correction unit corrects at least one of the first position and the second position by adjusting a position of at least one of the objective lens, the condenser lens, the second lens, and the photoelectric conversion unit.

5. The defect detection device according to claim 3, wherein
   the correction unit corrects at least one of the first position and the second position by moving the position of the optical element in a direction parallel to an optical axis of the scattered light.

6. The defect detection device according to claim 3, wherein
   the correction unit corrects at least one of the first position and the second position by moving the position of the optical element in a direction orthogonal to an optical axis of the scattered light.

7. The defect detection device according to claim 3, further comprising:
   a height detection unit configured to detect a position of the sample in a height direction, wherein
   the signal processing unit includes a correction amount calculation unit configured to calculate the first correction amount and the second correction amount according to the position of the sample in the height direction detected by the height detection unit, and
   the correction unit corrects at least one of the first position and the second position according to the first correction amount and the second correction amount that are calculated by the correction amount calculation unit.

8. The defect detection device according to claim 3, wherein
   the correction unit calculates the first position and the second position that are generated by changing a position of at least one of the objective lens, the condenser lens, the second lens, and the photoelectric conversion unit,
   the correction unit specifies, according to a result of the calculation, a combination of the objective lens, the condenser lens, the second lens, and the photoelectric conversion unit in which deviation of the first position is minimum and deviation of the second position is minimum, and
   the correction unit adjusts a position of the optical element or the photoelectric conversion unit included in the specified combination.

9. The defect detection device according to claim 1, wherein
the second lens is a lens array, and
the lens array includes a first lens and a second lens, and the first lens is disposed in a pupil region of the first scattered light, and the second lens is disposed in a pupil region of the second scattered light.

10. The defect detection device according to claim 1, wherein
the signal processing unit generates an integrated image of the scattered light by integrating the first image with the second image after the correction unit corrects the first position.

11. The defect detection device according to claim 10, further comprising:
a height detection unit configured to detect a position of the sample in a height direction, wherein
the signal processing unit includes an image forming position calculation unit configured to calculate a first deviation amount of the first position and a second deviation amount of the second position according to the position of the sample in the height direction detected by the height detection unit, and
the correction unit determines the first correction amount according to the first deviation amount and determines the second correction amount according to the second deviation amount.

12. The defect detection device according to claim 10, wherein
the correction unit corrects at least one of the first position and the second position by moving a position of an optical element provided in the detection optical system in a direction parallel to an optical axis of the scattered light, and
the correction unit further corrects deviation between the first position and the second position after the position of the optical element is moved, and then integrates the first image with the second image.

13. The defect detection device according to claim 10, wherein
the correction unit corrects at least one of the first position and the second position by moving a position of an optical element provided in the detection optical system in a direction orthogonal to an optical axis of the scattered light, and
the correction unit further corrects deviation between the first position and the second position after the position of the optical element is moved, and then integrates the first image with the second image.

14. The defect detection device according to claim 10, wherein
the correction unit groups the scattered light whose elevation angle from the sample is within a predetermined range,
the correction unit generates a temporary integrated image by integrating the scattered light belonging to the same group based on the grouping, and
the correction unit corrects a position of the temporary integrated image, and then generates the integrated image by integrating the corrected temporary integrated image with other scattered light.

15. The defect detection device according to claim 1, wherein
the detection unit includes:
a first detection unit configured to detect the scattered light traveling in a first direction when the scattered light is projected onto a horizontal plane, and
a second detection unit configured to detect the scattered light traveling in a second direction when the scattered light is projected onto a horizontal plane,
the first scattered light and the second scattered light travel in the first direction,
the first detection unit detects the first scattered light and the second scattered light,
the second detection unit detects third scattered light whose elevation angle from the sample is the first elevation angle and fourth scattered light whose elevation angle from the sample is the second elevation angle among the scattered light traveling in the second direction,
the correction unit corrects at least one of a third position of a third image of the third scattered light and a fourth position of a fourth image of the fourth scattered light, and
a third correction amount when the correction unit corrects the third position is larger than a fourth correction amount when the correction unit corrects the fourth position.

* * * * *